(12) United States Patent
Ota et al.

(10) Patent No.: US 7,785,406 B2
(45) Date of Patent: Aug. 31, 2010

(54) APPARATUS FOR VOLATILE ORGANIC COMPOUND TREATMENT AND METHOD OF VOLATILE ORGANIC COMPOUND TREATMENT

(75) Inventors: Kouji Ota, Tokyo (JP); Yasutaka Inanaga, Tokyo (JP); Yasuhiro Tanimura, Tokyo (JP); Masaki Kuzumoto, Tokyo (JP); Hajime Nakatani, Tokyo (JP); Hideo Ichimura, Tokyo (JP); Akio Masuda, Tokyo (JP); Shigeki Maekawa, Tokyo (JP); Masaharu Moriyasu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 251 days.

(21) Appl. No.: 11/913,246

(22) PCT Filed: Jun. 21, 2006

(86) PCT No.: PCT/JP2006/312422

§ 371 (c)(1),
(2), (4) Date: Oct. 31, 2007

(87) PCT Pub. No.: WO2007/004426

PCT Pub. Date: Jan. 11, 2007

(65) Prior Publication Data
US 2008/0210084 A1 Sep. 4, 2008

(30) Foreign Application Priority Data

Jul. 4, 2005 (JP) ............................. 2005-195245

(51) Int. Cl.
*B01D 53/14* (2006.01)
(52) U.S. Cl. .................... 96/146; 96/117.5; 96/144; 95/11; 95/141; 422/178

(58) Field of Classification Search .................... 95/11, 95/141; 96/117.5, 144, 146; 422/178
See application file for complete search history.

(56) References Cited

U.S. PATENT DOCUMENTS 5,487,869 A * 1/1996 Retallick ..................... 422/22

(Continued)

FOREIGN PATENT DOCUMENTS

JP 8 229345 9/1996

(Continued)

OTHER PUBLICATIONS

Translation of JP2001-198427, Yamaguchi, Jul. 21, 2001.*

*Primary Examiner*—Robert J Hill, Jr.
*Assistant Examiner*—Christopher P Jones
(74) *Attorney, Agent, or Firm*—Oblon, Spivak, McClelland, Maier & Neustadt, L.L.P.

(57) ABSTRACT

It is intended to provide a volatile organic compound treatment apparatus having: an absorption treatment chamber in which absorption frames having absorbents for absorbing volatile organic compounds are aligned in a direction of a gas flow; an absorbent recovery treatment chamber that is provided with a discharge unit having a high voltage electrode, a ground electrode, and a dielectric; and a transfer mechanism for transferring the absorption frames present in an upstream of the gas flow to the absorbent recovery treatment chamber and transferring the absorption frames in the absorbent recovery treatment chamber to a downstream of the gas flow. The volatile organic compound treatment apparatus is capable of decomposing VOC without generating a large amount of harmful NOx and reduced in apparatus cost.

16 Claims, 33 Drawing Sheets

U.S. PATENT DOCUMENTS

| | | | |
|---|---|---|---|
| 2004/0103782 A1* | 6/2004 | Wascheck et al. | 95/50 |
| 2007/0071657 A1* | 3/2007 | Okubo et al. | 422/186.03 |
| 2007/0193447 A1* | 8/2007 | Uji | 95/141 |

FOREIGN PATENT DOCUMENTS

| | | |
|---|---|---|
| JP | 11 114351 | 4/1999 |
| JP | 2001 179032 | 7/2001 |
| JP | 2001 198427 | 7/2001 |
| JP | 2002 28445 | 1/2002 |
| JP | 2002 126445 | 5/2002 |
| JP | 2003 10625 | 1/2003 |
| JP | 2003 10626 | 1/2003 |
| JP | 2006 175422 | 7/2006 |
| WO | WO 2005037412 A1 * | 4/2005 |

* cited by examiner

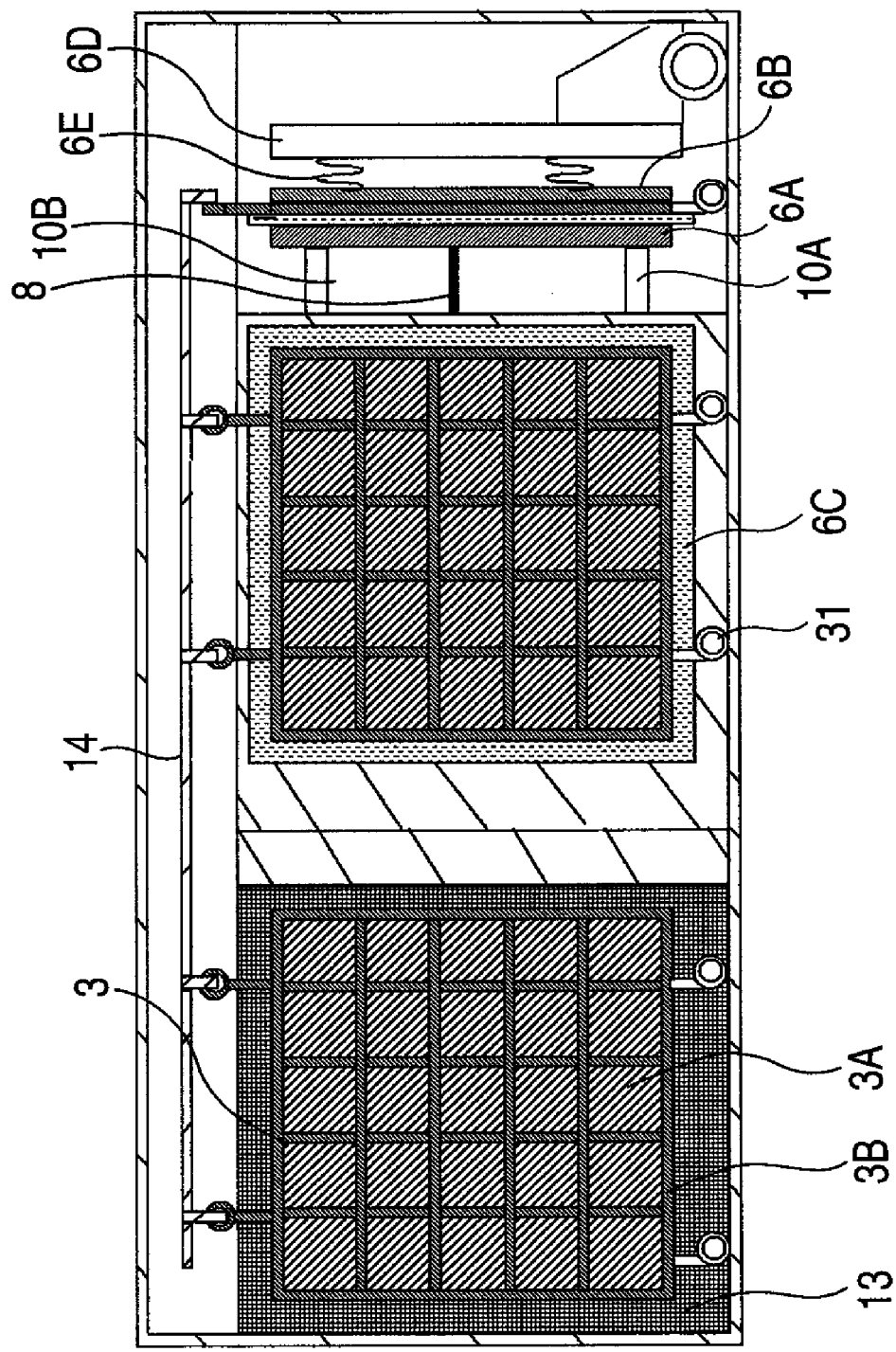

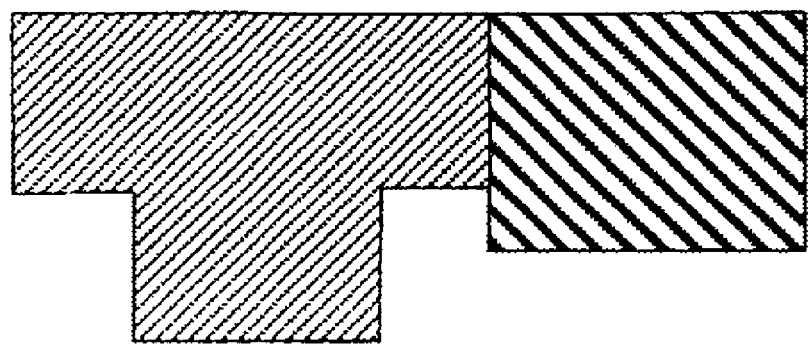
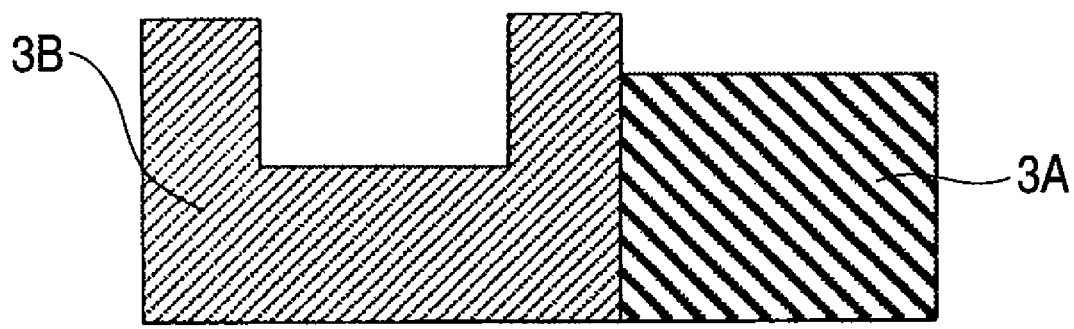

APPARATUS FOR VOLATILE ORGANIC COMPOUND TREATMENT AND METHOD OF VOLATILE ORGANIC COMPOUND TREATMENT

TECHNICAL FIELD

The present invention relates to a volatile organic compound treatment apparatus to be used for decomposing vapors of organic solvents such as toluene, xylene, and styrene that are harmful when released to the atmosphere and other organic compounds, i.e. for decomposing volatile organic compounds (VOC).

BACKGROUND ART

Large amounts of organic solvents are used in paint factories, semiconductor factories, or printing factories. It has been known that the VOC emitted from the factories to the atmosphere influence considerably adversely on the atmospheric environment by: forming harmful organic fine particles through a reaction with solar light, ozone, and the like; increasing an ozone concentration in the atmosphere; and the like. Therefore, there has been a strong demand for collection/detoxification of the VOC.

As a method for collecting and detoxifying the VOC with a reduced energy amount, a method of desorbing and decomposing the VOC that have been absorbed by a hydrophilic zeolite by using silent discharge has been proposed. (see Patent Document 1, for example).

Also, there has been known a method including: absorbing VOC by bringing an exhaust gas containing the VOC in contact with a photocatalyst in the form of particles; and irradiating the photocatalyst with ultraviolet light while being transferred on a belt conveyer (see Patent Document 2, for example).

Patent Document 1: JP-A-2002-126445 (see FIG. 1 and pages 2 to 3)

Patent Document 2: JP-A-2002-284.45 (see FIG. 1 and pages 4 to 5)

When the VOC absorbent is in a state where absorption is saturated to fail to satisfactorily absorb the VOC in the gas, such state is called breakdown of the VOC absorbent (see Patent Document 1, for example).

In a harmful substance cracking unit using a photocatalyst, the photocatalyst in the form of fine particles is taken out from an absorbing layer and then decomposed/recovered by irradiation with ultraviolet light during the photocatalyst is transferred on a belt conveyer. In this case, since the photocatalyst is taken out from the absorbent and transferred on the belt conveyer, the photocatalyst must be in the form of the fine particles.

DISCLOSURE OF THE INVENTION

Problem that the Invention is to Solve

Although the conventional method of desorbing and decomposing the VOC by using the silent discharge is capable of treatment with reduced energy as compared to the method of desorbing the VOC by heating or light irradiation, it is necessary to cause uniform discharge on a part to which the VOC are not absorbed because all the VOC absorbents are treated at once in the method, thereby raising a problem of an increase in discharge current. The increase in discharge current leads to an increase in electric power capacity, thereby raising a problem of an increased apparatus cost.

Also, since an amount of a gas generated when the discharge occurs is the same of that when the discharge does not occur, there has been a problem that nitrogen in the gas reacts with oxygen due to the discharge resulting in generation of a large amount of harmful nitrogen oxide (NOx).

With the method disclosed in Patent Document 2, the photocatalyst serving as the absorbent is brought into contact with a gas while being transferred from a gas outlet to a gas inlet to absorb the VOC and then transferred on the belt conveyer while being irradiated with ultraviolet light for decomposition/recovery. Since it is unnecessary to treat the photocatalyst that has not absorbed the VOC in the method, unnecessary optical energy is not used.

However, in order to uniformly irradiate the ultraviolet light, it is necessary to form the photocatalyst serving as the absorbent into fine particles and to perform the treatment while vibrating the fine particles in this method. The silent discharge performed on the particulate absorbent has a problem that the discharge becomes unstable due to difficulty in controlling a gap length of the discharge, therefore there is a problem that this method cannot be adopted to a method of desorption by the silent discharge.

The present invention has been accomplished for the purpose of solving the above-described problems, and an object thereof is to obtain a volatile organic compound treatment apparatus that decomposes VOC efficiently without generating a large amount harmful NOx and is low in apparatus cost.

Means for Solving the Problems

A volatile organic compound treatment apparatus according to the invention comprises: an absorption treatment chamber in which absorption frames having absorbents for absorbing volatile organic compounds are aligned in a direction of a gas flow; an absorbent recovery treatment chamber that is provided with a discharge unit having a high voltage electrode, a ground electrode, and a dielectric; and a transfer mechanism for transferring the absorption frames present in an upstream of the gas flow to the absorbent recovery treatment chamber and transferring the absorption frames in the absorbent recovery treatment chamber to a downstream of the gas flow.

Effect of the Invention

Since the volatile organic compound treatment apparatus according to the invention comprises: an absorption treatment chamber in which absorption frames having absorbents for absorbing volatile organic compounds are aligned in a direction of a gas flow; an absorbent recovery treatment chamber that is provided with a discharge unit having a high voltage electrode, a ground electrode, and a dielectric; and a transfer mechanism for transferring the absorption frames present in an upstream of the gas flow to the absorbent recovery treatment chamber and transferring the absorption frames in the absorbent recovery treatment chamber to a downstream of the gas flow, the volatile organic compound treatment apparatus recovers the absorbents that are high in volatile organic substance concentration ratio among the absorbents absorbed the volatile organic substance, thereby making it possible to efficiently decompose the volatile organic substance.

BRIEF DESCRIPTION OF THE DRAWINGS

FIG. 2 A drawing showing a structure of the volatile organic compound treatment apparatus according to Embodiment 1 of the invention.

FIG. 10 A drawing showing another method of combining the absorption units according to Embodiment 1 of the invention.

DESCRIPTION OF REFERENCE NUMERALS AND SIGNS

1: absorption treatment chamber, 2: absorbent recovery treatment chamber, 3: absorption unit, 3A: absorbent, 3B frame, 5: absorption unit combining mechanism, 5A: hook, 5B: ratchet, 5C: spring, 6: discharge unit, 6A: high voltage electrode, 6B: ground electrode, 6C: dielectric, 6D: ground electrode pressing support: 6E: ground electrode pressing spring, 7: high voltage power source, 8: high voltage wire, 9: switching element, 10: chiller, 10A, 10B: cooling pipings, 11: filter, 12: exhaust fan, 13: sealing plate, 14: absorption unit transfer mechanism, 14A: absorption unit transfer mechanism in absorption chamber, 14B: absorption unit transfer mechanism for transfer to recovery treatment chamber, 15: gas inlet, 16: gas outlet, 17: sensor, 18: controller, 19: air supply inlet, 20: exhaust outlet, 21: shielding plate, 22: pressing plate, 23: projection, 24: electromagnet, 30: metal wire, 31: wheel, 33: oxygen generator, 34: pressure adjuster, 43: rotor, 44: driving rotor, and 45: transfer rotor.

BEST MODE FOR CARRYING OUT THE INVENTION

Embodiment 1

Figure 1:
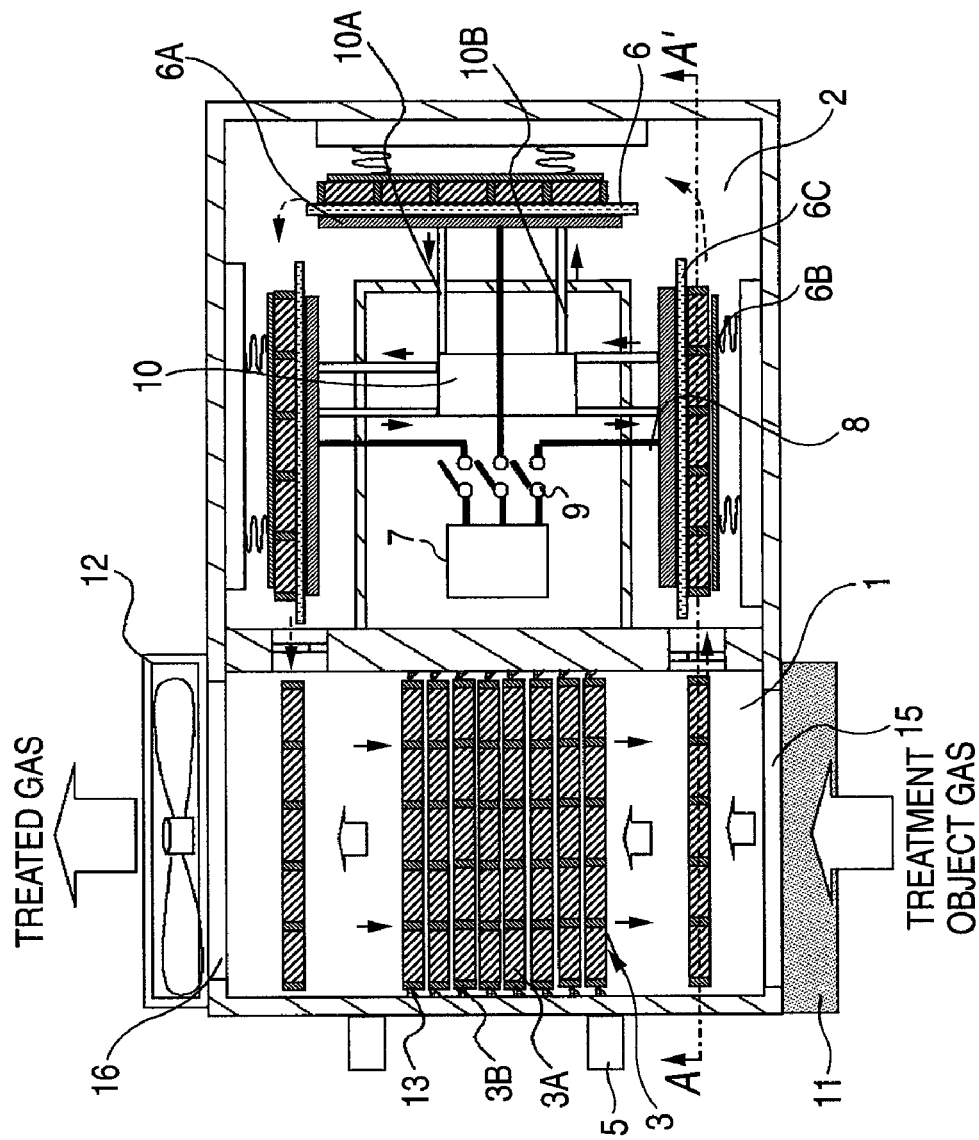
FIG. 1 A drawing showing a structure of a volatile organic compound treatment apparatus according to Embodiment 1 of the invention.

FIG. 1 is a schematic diagram showing a volatile organic compound treatment apparatus according to Embodiment 1 of the invention. Referring to FIG. 1, absorption units 3 having absorbents 3A and frames 3B for retaining the absorbents 3A are aligned along a direction of a flow of a gas in an absorption treatment chamber 1. Note that a gas inhaled into the volatile organic compound treatment apparatus is referred to as a treatment object gas and a gas exhaust from the volatile organic compound treatment apparatus is referred to as a treated gas. A sealing plate 13 is provided between a circumference of the absorption units 3 and a wall of the absorption treatment chamber 1 so that the treatment object gas flows inside the absorption units 3 without flowing to the circumference of the absorption units 3. A gas inlet 15 for introducing the treatment object gas is provided on one surface of the absorption treatment chamber 1. A filter 11 is disposed at the gas inlet 15. A gas outlet 16 is provided on one surface opposed to the gas inlet 15. An exhaust fan 12 is provided at the gas outlet 16 so that the treatment object gas flows in a direction from the gas inlet 15 to the gas outlet 16. The filter 11 is used for eliminating components such as a paint residue and an oil component that are high in viscosity and relatively easily separated from the treatment object gas. In the case where the components removable by the filter 11 are not contained in the treatment object gas, such as when a gas which has been treated by another apparatus is the treatment object gas, the filter 11 may not be provided.

When there is a gap between the absorption units and the wall of the absorption treatment chamber 1, the treatment object gas containing VOC is exhausted outside without passing through the absorbents, thereby reducing a treatment ratio of eliminating VOC from the air containing VOC. Therefore, the sealing plate 13 is disposed for the purpose of causing the gas to flow through the absorbents.

An absorbent recovery treatment chamber 2 is provided adjacent to the absorption treatment chamber 1. The absorption treatment chamber 1 and the absorbent recovery treatment chamber 2 are communicated to allow the absorption units 3 to move at two points in the vicinities of the gas inlet 15 and the gas outlet 16. The communicating openings between the absorption treatment chamber 1 and the absorbent recovery treatment chamber 2 are closed except when the absorption unit 3 are moved and has a structure that the treatment object gas does not flow into the absorbent recovery treatment chamber 2.

In the absorbent recovery treatment chamber 2, discharge units 6 each including a high voltage electrode 6A, a ground electrode 6B, and dielectric 6C made from glass or a ceramic are disposed so as to generate discharge inside the absorption units 3.

Also, a high voltage power source 7 for applying a high voltage required for the discharge to the high voltage electrode 6A, switching elements 9 for switching the high voltage, and the high voltage electrodes 6A are connected to one another. Also, a cooling water piping 10A for cooling the dielectric 6C is connected to each of the discharge units 6. The cooling water piping 10A is connected to a chiller 10 so that cooling water is circulated.

FIG. 2 is a schematic diagram showing an A-A' section of FIG. 1. FIG. 2 shows a schematic diagram of a transfer mechanism of the absorption units 3 in the absorption treatment chamber 1 and the absorbent recovery treatment chamber 2.

An absorption unit transfer mechanism 14 is provided above the absorption treatment chamber 1 and the absorbent recovery treatment chamber 2. The absorption units 3 are suspended from the absorption unit transfer mechanism 14.

In order to enable smooth movement of the absorption unit 3, wheels 31 are attached to a lower part of the absorption unit 3.

The ground electrode 6B is supported by a ground electrode pressing spring 6E on a ground electrode pressing support 6D.

When the absorption unit is lightweight enough to be suspended and moved by the transfer mechanism, the wheels are not necessarily provided, and the pressing spring 6E may be made from a rubber, an urethane, or a gel-like solid. Any spring that is elastic enough to hold the ground electrode in such a manner as to keep the gap length constant when sandwiching the adsorbent may be used. In the case where the ground electrode is heavy, it is necessary to support the ground electrode by a stick or the like fixed on a separate support.

Figure 3A:
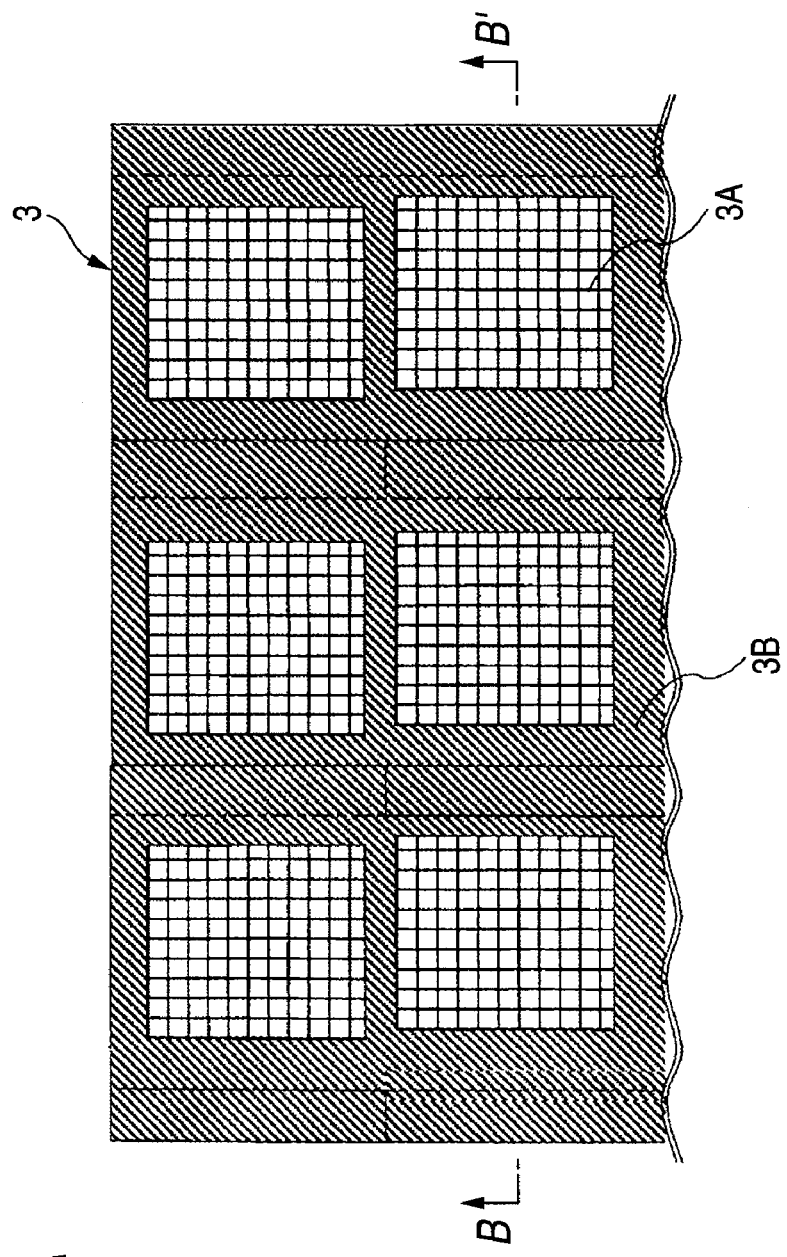
FIG. 3 A drawing showing a structure of an absorption unit according to Embodiment 1 of the invention.
Figure 3B:

FIG. 3($a$) is a plan view showing the absorption unit.

The absorption unit 3 includes the frames 3B and the absorbents 3A each formed of a honeycomb base and has a structure that the absorbent 3A is fitted into the frame 3B. The absorbent 3A is obtainable by depositing a hydrophobic zeolite to the honeycomb base having holes of 15.5 to 77.5 holes per square meter. The honeycomb base is obtainable by sintering a ceramic, a paper ceramic, or zeolite. In order to reduce a radius of rotation during transfer as much as possible, the frame is in the form of a hinge as shown in FIG. 3($b$). When a treatment amount is 10,000 $m^3$/hr, the size of the absorption unit is such that each side is about 1 to 2 m and that a thickness is about 3 to 50 mm. A plurality of the absorption units 3 are overlapped to perform the absorption treatment. Since an operation power is increased with an increase in pressure loss of the absorbent, it is desirable to reduce the pressure loss as much as possible. Therefore, an opening area is adjusted so that a speed of wind passing by a front surface of the absorbent is in the range of 0.3 to 2 meters. Also, since an increase in number of the absorption units 3 leads to the increase in pressure loss, a length (thickness of the absorbent) in a direction of flow of the wind of the absorption unit is set from 100 to 1,000 mm.

Since the absorbent is thus-reinforced by the frame, it is possible to prevent the absorbent from being damaged by abrasion during the transfer.

Figure 4:
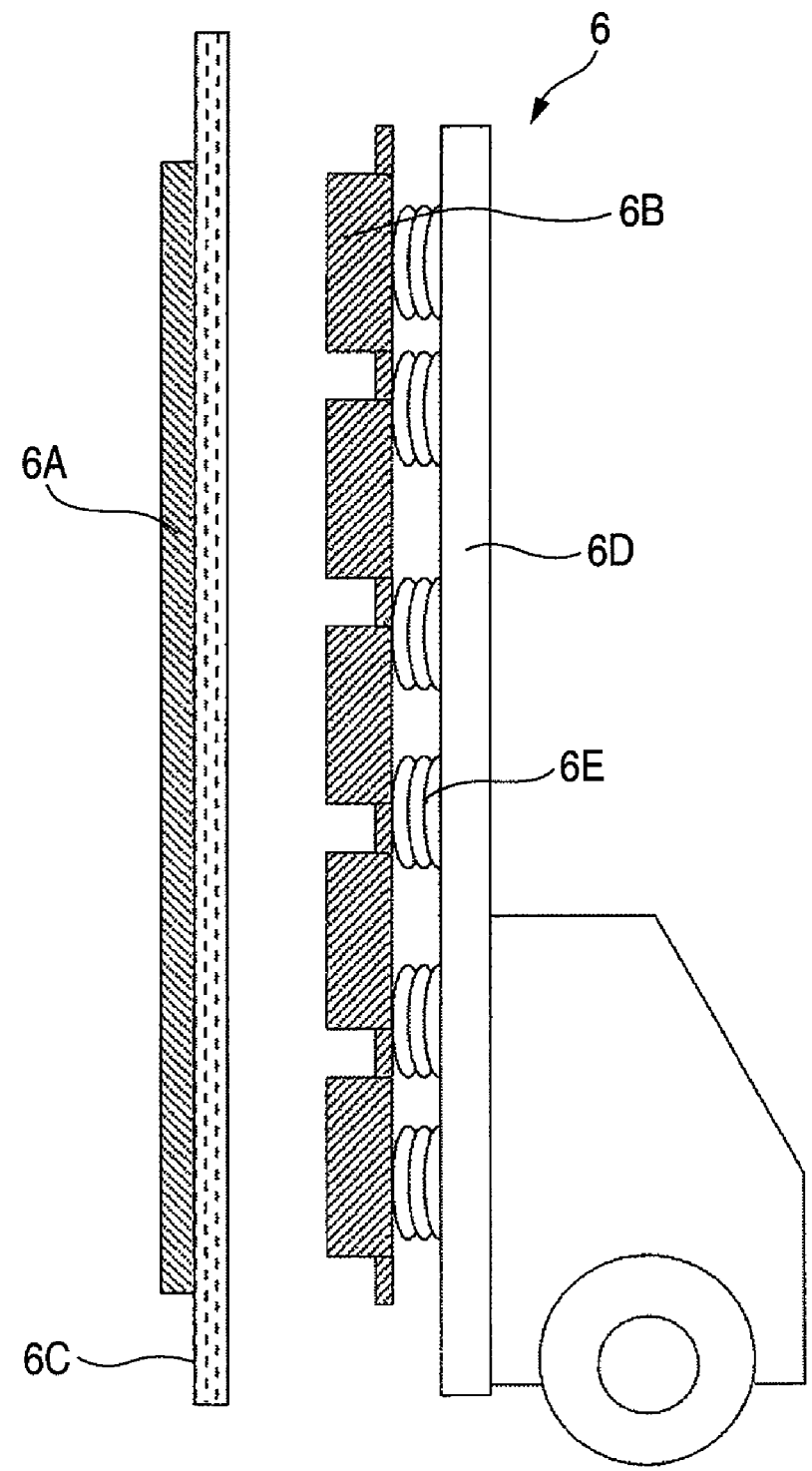
FIG. 4 A drawing showing a structure of a discharge unit according to Embodiment 1 of the invention.

FIG. 4 is a schematic diagram showing the discharge unit 6 when the absorption unit 3 is removed. The high voltage electrode 6A and the dielectric 6C are fixed to the absorbent recovery treatment chamber 2. The ground electrode 6B has a projected shape so as to correspond to the shape of the lattice frame of the absorption unit 3.

Figure 5:
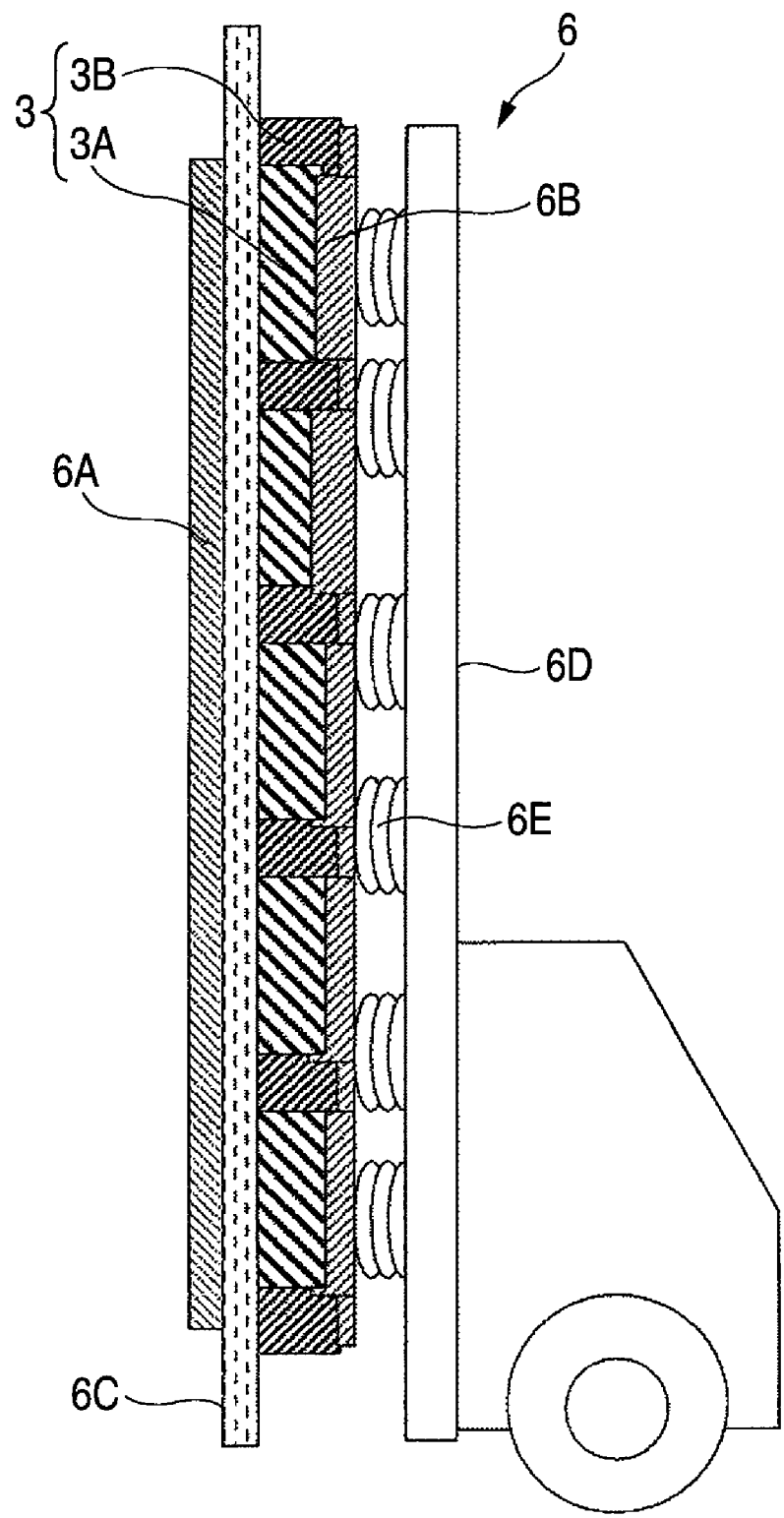
FIG. 5 A drawing showing a structure of the volatile organic compound treatment apparatus during an absorption unit recovery according to Embodiment 1 of the invention.

FIG. 5 is a schematic diagram showing a state in which the absorption unit 3 and the discharge unit 6 are combined with each other.

As shown in FIG. 5, in the case where the absorption unit 3 is disposed between the dielectric and the ground electrode, the ground electrode moving wheel moves to sandwich the absorption unit 3. When the absorption unit 3 is sandwiched, the absorbent 3A and the dielectric 6C are in closely contact to each other, and the absorbent 3A and the ground electrode 6B are in closely contact to each other. With such structure, it is possible to reduce an abnormal discharge otherwise caused by a gap during the discharge.

Also, by pressing the ground electrode 6B with the ground electrode pressing spring 6E, it is possible to form the discharge gap length with high accuracy. When the discharge gap is uniform, it is possible to prevent the discharge from concentrating on one point as well as to expand the discharge uniformly on an electrode surface, thereby enabling the VOC decomposition treatment on a wide range. In this case, a space closed by the dielectric 6C and the ground electrode 6B is formed in a space defined in the frame 3B of the absorption unit 3. With such space, it is possible to treat VOC without allowing ozone and nitrogen oxide generated by the discharge to leak to the circumference.

When recovering the absorbent by subjecting the discharge to the absorbent, it is possible to efficiently decompose VOC as well as to reduce ozone and nitrogen oxide generated by the discharge by keeping the absorbent in the closed space by the absorbent frame forming the high voltage electrode or the ground electrode and the absorbent.

Further, by pressing the absorbent with an elastic body such as the spring when sandwiching the absorbent by the high voltage electrode or the ground electrode and the dielectric, it is possible to form the uniform discharge gap, thereby enabling to uniformly input discharge energy.

As shown in FIG. 1, three sets of the discharge units 6 are provided in Embodiment 1. The absorption unit 3 is subjected to the discharge in each of the discharge units 6 for a certain time period and then ultimately returns to the position which is most leeward of the gas flow in the absorption treatment chamber 1, the discharge time periods in the discharge units 6 being equal to one another.

In the case where the gas flow rate is slow or in the case where a small amount of the gas flows from the absorption treatment chamber 1 to the absorbent recovery treatment chamber 2, it is possible to move three absorption units at one time to treat the three absorption units as one set in each of the discharge units. In the case where the absorption units are transferred to each of the discharge units one by one, it is necessary to stop the discharge once. The present method is more efficient since the absorbents are not reduced in temperature once the absorbents reach to a certain temperature by subjecting the discharge, unlike the method of transferring the absorption units one by one to the discharge units.

The volatile organic compound treatment apparatus according to Embodiment 1 inhales the gas in an amount that is the same as the gas exhausted from the apparatus by the exhaust fan 12 as shown in FIG. 1.

Figure 6:
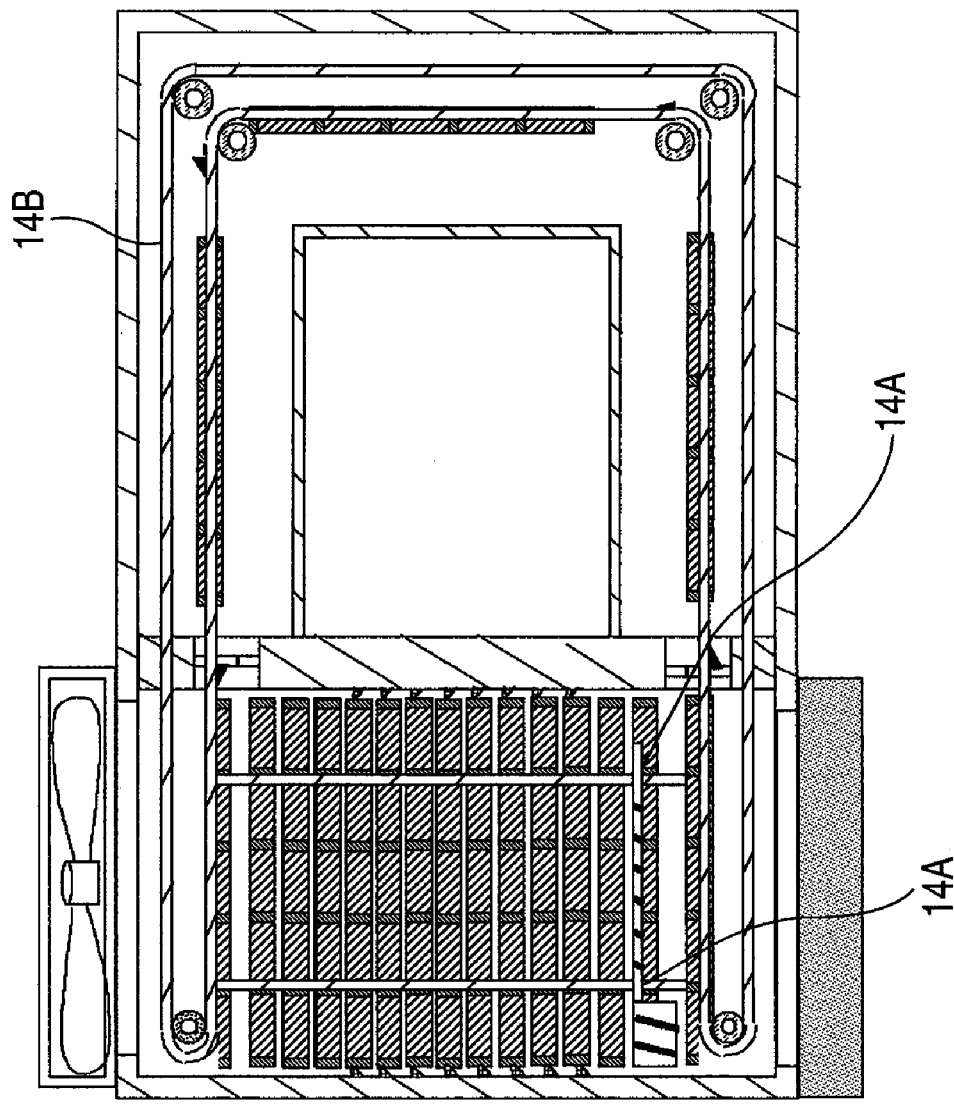
FIG. 6 A drawing showing a method of transferring the absorption unit of the volatile organic compound treatment apparatus according to Embodiment 1 of the invention.

Hereinafter an operation will be described. To start with, an operation state in the absorption treatment chamber 1 will be described. In the absorption treatment chamber 1, the absorption units 3 are disposed as being overlapped. The absorption units 3 are suspended from the absorption unit transfer mechanism 14 by an arm attached to an upper part of the frame. Also, as shown in FIG. 6, the absorption unit transfer mechanism is provided with two systems that are an absorption unit transfer mechanism 14A inside the absorption chamber and an absorption unit transfer mechanism 14B for transferring the absorption units to the recovery treatment chamber, and each of the absorption unit transfer mechanisms 14A and 14B operates independently.

The absorbent does not absorb VOC when it has absorbed a certain amount of VOC. In this treatment apparatus, the absorbents are sequentially transferred to the absorbent recovery treatment chamber in such a manner that the absorbent disposed in the most windward from where the treatment object gas flows in is transferred to the absorbent recovery treatment chamber to be subjected to the recovery treatment by discharge. The absorption units are suspended as in a curtain rail and transferred to the absorbent recovery treatment chamber by the automatic transfer device 14B as shown in FIG. 6. The absorption unit thus transferred is sandwiched between the high voltage electrode 6A and the ground electrode 6B together with the dielectric 6C. This dielectric is disposed on either one of the high voltage electrode side or the low voltage electrode side or both of the high voltage electrode side or the low voltage electrode side.

The dielectric is reduced in voltage resistance for electricity insulation when the temperature thereof exceeds 100° C. Therefore, the dielectric is cooled by the cooling water. The high voltage electrode is cooled in the case where the dielectric is disposed close to the high voltage electrode, and the ground voltage electrode is cooled in the case where the dielectric is disposed close to the ground voltage electrode. In the case of cooling the high voltage electrode, a pure water having a resistivity of $10^4$ ($\Omega \cdot m$) is used as the cooling water in order to avoid conduction of electricity. In the case of FIG. 1, the high voltage electrode and the chiller 10 are connected to each other via the cooling water pipes 10A and 10B.

It is preferable that the absorption units 3 are not piled in a vertical direction with respect to the ground since a considerable weight is applied on the lowermost part when the absorption units 3 are piled up. Therefore, it is preferable to dispose the absorption units 3 along a direction parallel to the ground. Also, in the case where the lower part of the absorbent unit 3 is supported, it is necessary to provide a platform having a large area in order to stabilize the absorbent unit 3 so as to avoid falling. In the case where the absorption unit 3 is suspended from the upper part, it is possible to design the absorbent unit 3 compact as well as to prevent curvature of the frame unit and damages of the absorbent since too much stress is not imparted when transferring the absorption unit.

The hydrophobic zeolite is used for the absorbent fixed to the absorption unit. Since the hydrophobic zeolite is called high-silica zeolite and contains a large amount of silica ($SiO_2$) component, it is suppressed in moisture absorption. A large amount of moisture in the air is contained in the treatment object gas in addition to VOC that are the treatment object. Particularly in summer when the humidity is high, a water concentration is increased to about 3% (volumetric ratio) that is 100 times that of VOC concentration. Therefore, the use of the hydrophobic zeolite is effective for preventing the absorption property under the high humidity environment in summer. However, the zeolite is not necessarily hydrophobic when the apparatus is provided with a dehumidifier for eliminating the moisture, and a zeolite having a pore diameter of 5 angstroms or more may be used for the absorbent.

Although the hydrophobic zeolite is in the form of honeycomb in the foregoing description, a spherical hydrophobic zeolite or a column-like hydrophobic zeolite may be housed in the frame, and the shape of the hydrophobic zeolite is not particularly limited insofar as the hydrophobic zeolite allows the treatment object gas to pass therethrough and is disposed between the electrodes. The absorbent is not limited to the zeolite and may be a high silica absorbent such as mesoporous silicate, dealumination faujasite, high silica pentasyl zeolite, and silica gel or may be other types of absorbents. Any absorbent may be used insofar as the absorbent absorbs and desorbs VOC.

When the VOC absorbent is in a state where absorption of the treatment object gas is saturated so that the absorbent cannot absorb the gas any more, such state is called absorption breakdown. In the overlapped absorbent units 3, the absorbents are brought into the breakdown state sequentially in the order from the upstream to the downstream of the gas flow. Since the purpose of the apparatus is to treat VOC, it is necessary that the VOC concentration at the outlet of the apparatus is equal to or lower than a given emission value such as an environmental reference value.

In Embodiment 1, the absorbents in the absorption unit near the inlet have been in the breakdown state, and the absorbents in the absorption unit 3 close to the gas outlet have not been in the breakdown state and are capable of VOC absorption treatment. As disclosed in Patent Document 1, the energy required for the VOC treatment is reduced with an increase in VOC concentration. Therefore, by treating the absorbent after the breakdown, it is possible to highly efficiently decompose VOC while suppressing the energy required for the decomposition.

In the VOC treatment apparatus according to the invention, since the absorption units are treated sequentially in such a manner that the absorbent that is in the absorption breakdown state and disposed in the most upstream of the gas flow is treated, the decomposition is performed efficiently. Also, the absorption unit of which the decomposition has been finished and the absorbents are recovered is moved to a position that is the most downstream of the gas flow, so that it is possible to sequentially and continuously perform the treatment of the absorption unit having the absorbents in the absorption breakdown state. When the treatment gas passes through the circumference of the unit without passing through the absorbent, a VOC treatment rate is reduced. Therefore, it is necessary to provide the sealing plate 13 for sealing the gas in the circumference of the absorption unit for preventing the gas from leaking and passing through the unit circumference. Also, for the purpose of stabilizing the absorption units, the absorption units may preferably be transferred as being integrated with one another in the absorption treatment chamber.

In Embodiment 1, since the absorption panel is transferred in a horizontal direction in the absorption treatment chamber, it is possible to uniformly absorb the volatile organic substances on the panel surface as well as to uniformly provide the discharge energy for decomposing the volatile organic substances, thereby enabling to efficiently decompose the volatile organic substances.

Figure 7:
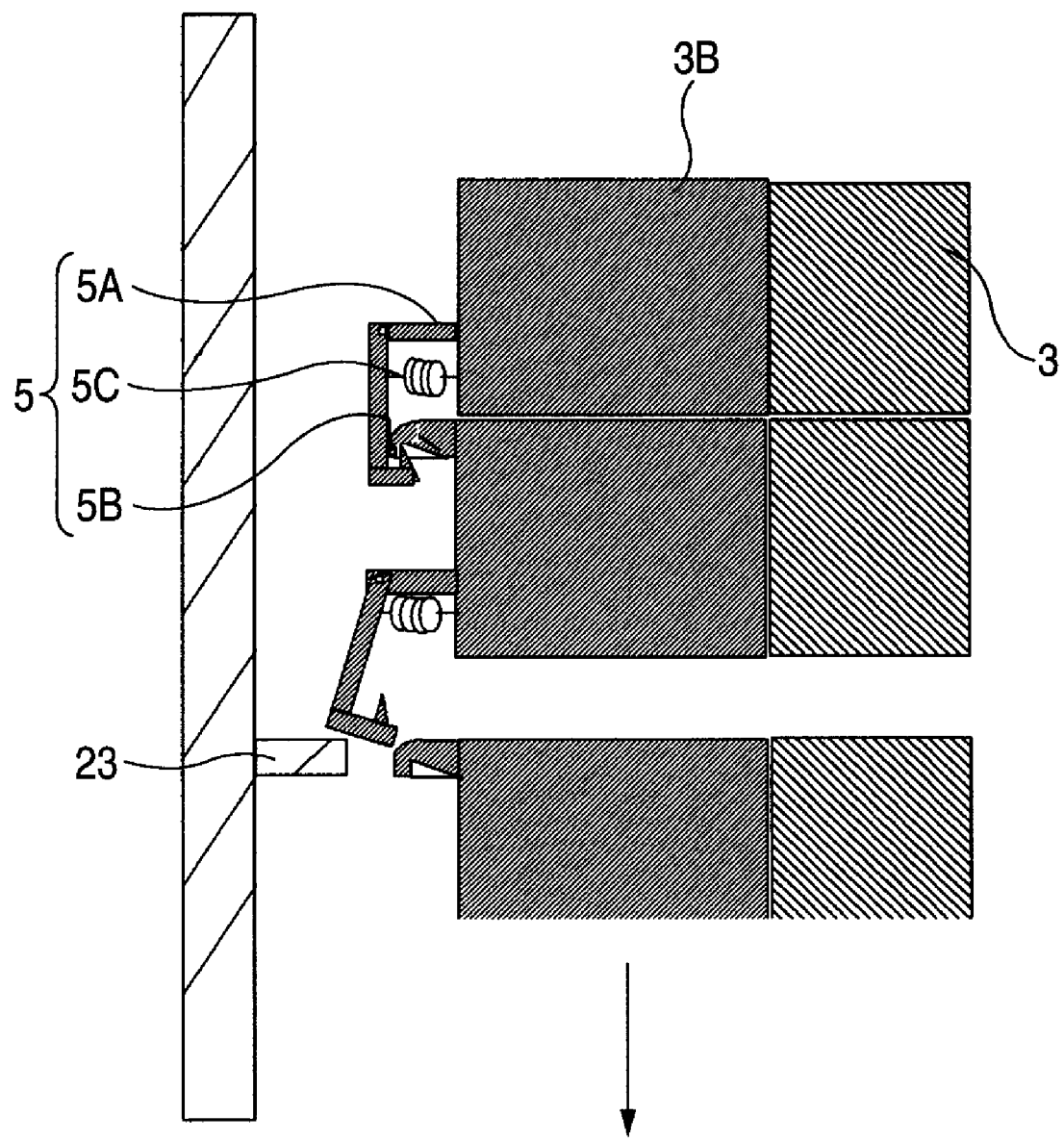
FIG. 7 A drawing showing a method of separating the absorption units according to Embodiment 1 of the invention.
Figure 8:
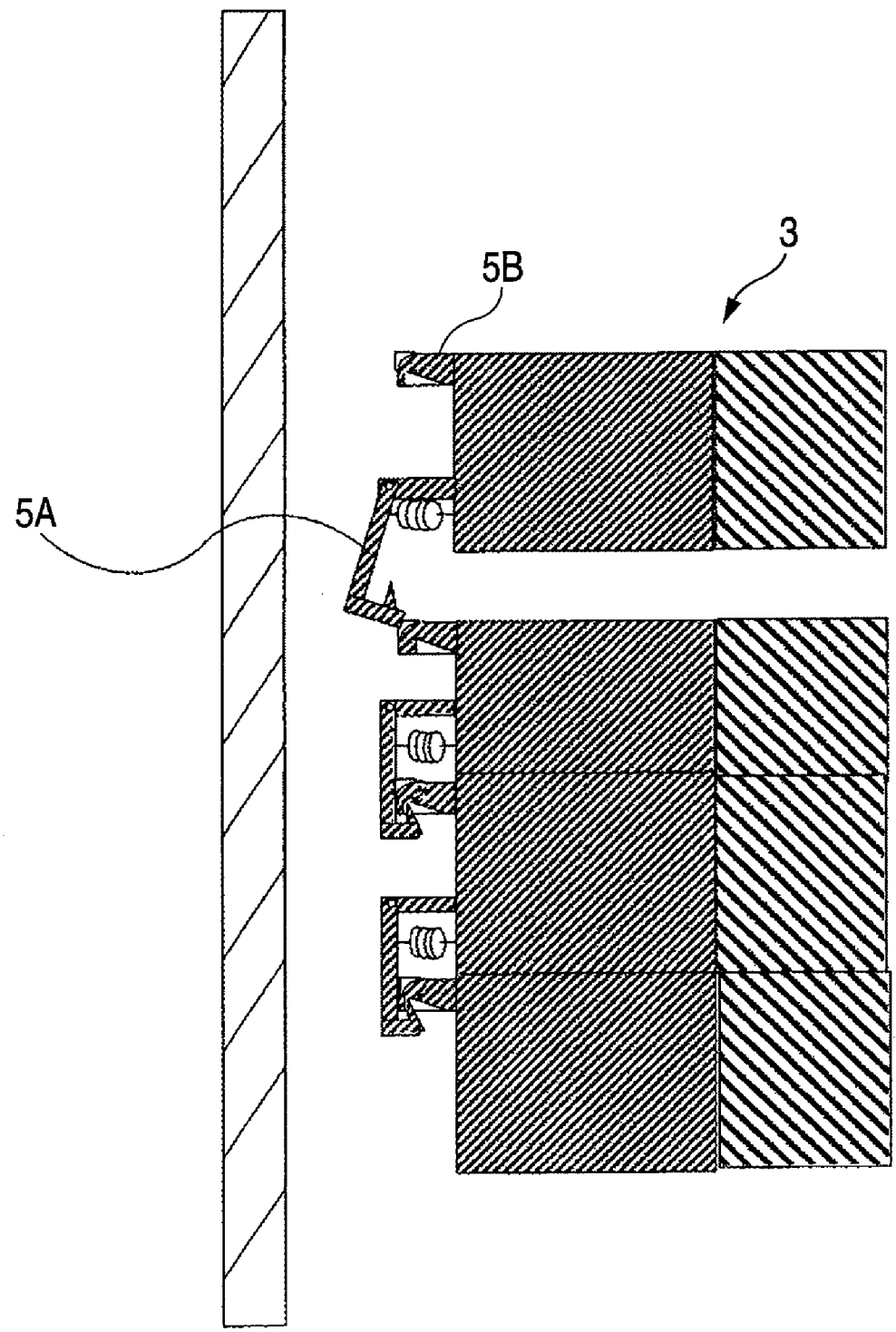
FIG. 8 A drawing showing a method of combining the absorption units according to Embodiment 1 of the invention.

FIGS. 7 and 8 are illustrations of an absorption unit combining mechanism for combining the absorption units in the absorption treatment chamber. As shown in FIG. 7, the absorption unit combining mechanism 5 is formed of a ratchet 5A in the form of a wedge and a hook 5B, which are attached to the absorption unit 3, and a spring 5C disposed between the hook 5B and the frame 3. The absorption units 3 are fastened by the ratchet hook 5A and the hook 5B. When the absorption units 3 pass through a projection 23 attached to the absorption treatment chamber 1, the ratchet 5A is caught by the projection 23 so that the ratchet 5A and the hook 5B are automatically separated.

Figure 9:
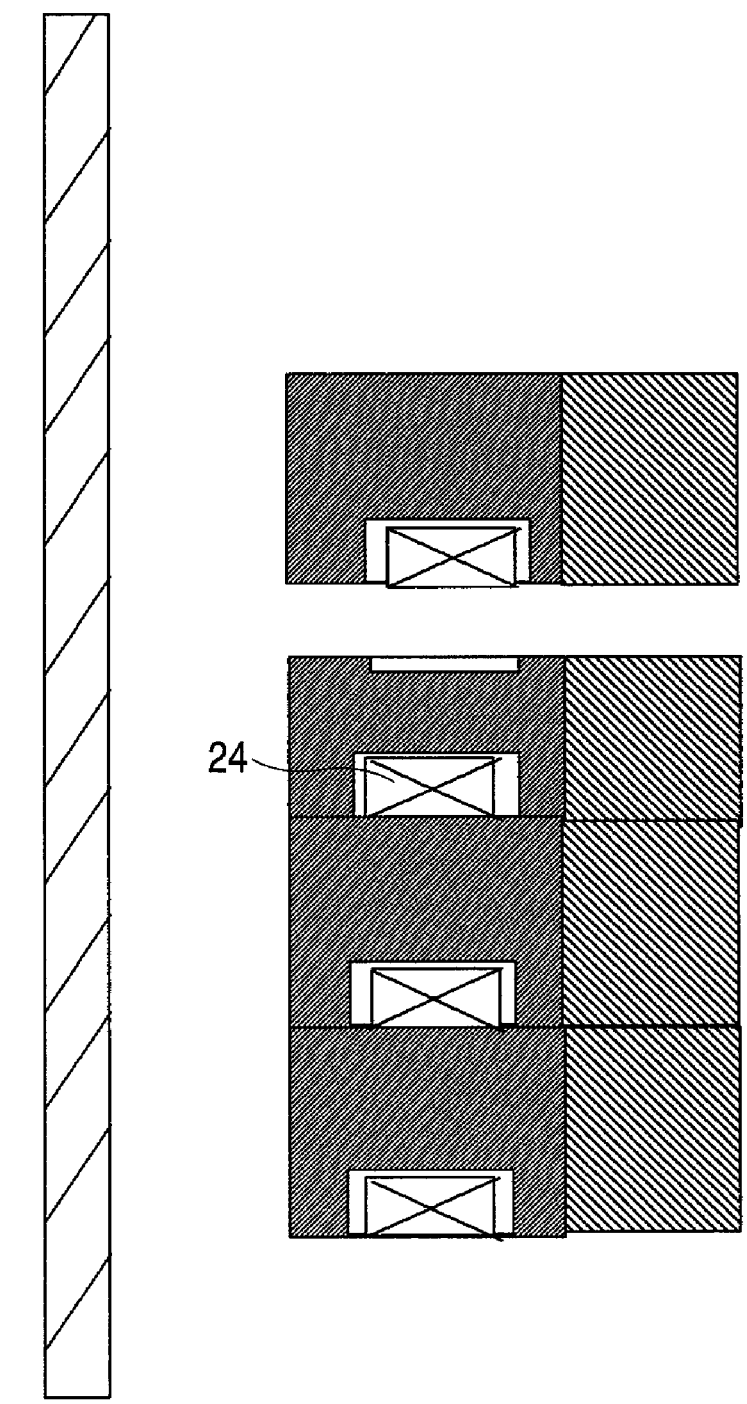
FIG. 9 A drawing showing another method of combining the absorption units according to Embodiment 1 of the invention.

In the case of combining the absorption units, the hook is opened automatically due to the round shape of the hook 5B when the recovered absorption units 3 are moved to a direction of the integrated unit, so that the absorption units are combined to be integrated. The absorption unit combining mechanism may be formed by forming the frame from a magnetic substance by embedding an electromagnet 24 in the frame as shown in FIG. 9 and by moving the absorption unit combining mechanism with the magnetic force. Also, a projection and a depression may be formed on the frame 3B as shown in FIG. 10 so that the absorbents are integrated by fitting. In this case, a plate-like projection may be inserted from a lateral direction for combination and separation.

The absorption units after the breakdown are sequentially sent to the absorption recovery treatment chamber 2. The treatment object gas continuously flows into the absorption treatment chamber. A curtain in the form of a barred lattice is disposed between the absorption treatment chamber 1 and absorbent recovery treatment chamber 2 in order to prevent the treatment object gas from flowing into the absorbent recovery treatment chamber 2 when the absorbing unit 3 is transferred from the absorption treatment chamber 1 to the absorbent recovery treatment chamber 2 or from the absorbent recovery treatment chamber to the absorption treatment chamber 1.

At least one discharge unit is present in the absorbent recovery treatment chamber 2. In Embodiment 1, the three discharge units 6 are provided. The larger the number of the discharge units is, the smaller the discharge energy to be provided per unit area, and the longer the discharge treatment time to be ensured.

After the absorption unit 3 is sent to the absorbent recovery treatment chamber 2, the absorbents inside the absorption unit 3 are sandwiched between the dielectric made from a glass or a ceramic and the ground electrode as described in the foregoing so that a closed space is formed. After that, the switching element is turned on so that a voltage having a crest value of about 10 to 30 kV is applied to the high voltage electrode 6A at a frequency of about 50 to 10,000 Hz.

The VOC are decomposed through a collision with electrons generated by the discharge or through a reaction with active species such as oxygen atoms and ozone generated by a collision between the electrons generated by the discharge and oxygen molecules. Therefore, the higher the VOC concentration in the treatment object gas is, the more the probability of the reaction of VOC with electrons or active species is increased, and the more the efficiency of the treatment is increased. Therefore, in the continuous method where the VOC are not concentrated, the power consumption is larger than that in this method and the intermittent method where the VOC are concentrated. A life of the oxygen atom that has a stronger VOC decomposition property than ozone is about 1 micro second, which is short, and the oxygen atom disappears after little moving after the generation. Therefore, the VOC decomposition by oxygen atom occurs adjacent to the point of generation of the discharge. A life of ozone is about 100 seconds, which is relatively long, so that the VOC are decomposed at a point distant from the point where the discharge is generated in the gas treatment unit 1 when the ozone moves to the point to react with the VOC.

The absorbent 3A is increased in temperature by subjecting the discharge to release the absorbed VOC. The released VOC are decomposed into water and carbon dioxide as a result of colliding with electrons and reacting with the active species such as the oxygen atoms and ozone generated by the discharge. The VOC are desorbed from the absorbent 3A, and the absorbent 3A is recovered to the state of being capable of absorbing the VOC.

Embodiment 1 provides the structure wherein the treatment object gas does not flow to the absorbing units 3 during the discharge treatment. This structure is for the purpose of suppressing the generation of NOx as much as possible. Fast electrons are generated by injection of the discharge energy, and the generated fast electrons collide with oxygen molecules and nitrogen molecules in the treatment object gas to generate harmful NOx. When the gas flow is stopped during the discharge treatment, the NOx concentration inside the gas treatment unit 1 is increased, but an amount of NOx to be generated is reduced due to the small amount of the gas. When the NOx concentration in the gas becomes about 3%, the NOx decomposition and the NOx generation are substantially balanced to reach equilibrium, so that the NOx concentration is no longer increased when the inputted discharge energy is increased.

In the case where the gas is stopped, the equilibrium occurs in the inner space of the gas processing unit 1, so that an amount of NOx to be generated is about 3% with respect to a volume of the inner space of the gas treatment unit 1. The volume of the inner space of the gas treatment unit 1 is considerably small as compared to the gas flow rate, so that the NOx to be generated is reduced. In the case where an amount of the gas to be supplied during the discharge generation is the same as that of when the discharge is not generated, NOx is generated substantially proportional to the inputted discharge energy.

The effect of reducing the NOx generation amount by stopping the gas flow during the discharge generation is applicable to the intermittent method. However, in the case of application to the intermittent method, since it is impossible to supply the treatment object gas to the VOC treatment apparatus during the discharge generation, it is necessary to store the treatment object gas generated during the stoppage or to prevent the treatment object gas from generation. Since the gas flow is stopped in only a part of the gas treatment unit in the present method, the present method has the effect of being free from the discontinuation of the treatment of the treatment object gas as the whole VOC treatment apparatus.

However, since it is necessary to supply the oxygen required for the VOC decomposition, the NOx generation is not caused by the discharge, and the oxygen atoms and ozone are generated efficiently when it is possible to supply the oxygen during the discharge decomposition, thereby making it possible to perform the VOC decomposition with reduced energy.

There has been a problem that, when an absorbent that has sufficiently absorbed VOC is subject to the discharge, since the absorbent temperature is increased by the discharge to cause the absorbed VOC to be rapidly desorbed, VOC that have not been decomposed by the discharge are leaked to the outside of the VOC treatment apparatus as the treated gas in the case where the gas is flown. By stopping the gas during the discharge, the VOC are prevented from leaking to the outside of the gas treatment unit. The desorbed VOC stay inside the absorbent unit 3 to be decomposed through the reaction with the electrons and active species.

By circulating the gas in such a manner that the gas is subjected to the discharge inside the closed space without leaking the gas desorbed during the discharge to the outside, it is possible to solve the problem of leaking of the VOC that have not been decomposed by the discharge to the outside of the VOC treatment apparatus as the treated gas, thereby attaining an effect same as the effect achieved by stopping the gas as described in the foregoing.

From the view point of desorption of VOC from the absorbent 3A, the desorption effect is enhanced by an increase in temperature of the absorbent 3A. However, when the temperature of the gas inside the space in which the discharge is generated is raised and the temperature of the dielectric 6C is raised too much, the voltage resistance of the dielectric 6C is deteriorated to sometimes result in dielectric breakdown of the dielectric 6C. Since the VOC are not decomposed by the discharge when the dielectric breakdown of the dielectric 6C occurs, the absorbent 3A cannot be recovered in the case of dielectric breakdown. Although it is possible to avoid the insulation breakdown, the dielectric loss tan δ of the dielectric 6C is increased due to the increase in temperature of the dielectric 6C, resulting in an increase in power consumption.

Therefore, in Embodiment 1, the ground electrode 6B is water-cooled as shown in FIG. 1 to suppress the temperature rise of the dielectric 6C, thereby keeping the temperature of the dielectric 6C and the absorbent 3A to about 100° C. during the discharge. Since a phenomenon (so-called saturation phenomenon) of a reduction in speed of desorbing VOC from an absorbent due to an increase in VOC concentration around the absorbent occurs in conventional gas concentration rotors, the VOC desorption is performed by heating to about 300° C. so that it is possible to desorb VOC despite the phenomenon. In the present method, VOC are desorbed by the discharge and the desorbed VOC are decomposed at the site of discharge. Therefore, the saturation phenomenon does not occur, and it is possible to desorb VOC when the temperature of the absorbent is regulated to about 100° C. The temperature is not limited to 100° C. and may be higher or lower than 100° C. insofar as it is possible to protect the dielectric as well as to efficiently perform the desorption treatment.

Since the absorbent 3A is heated to about 100° C. during the generation of discharge, the temperature of the absorbent is lowered soon after the termination of the discharge to enable the VOC absorption. The temperature of the absorption unit 3 except for during the discharge is about the temperature of the cooling water. Even in the case where there is an absorption unit 3 that does not satisfactorily absorb VOC immediately after the termination of discharge, almost all of the absorption units 3 are capable of satisfactory absorption, so that an effect of not requiring a step of stopping the VOC decomposition for the absorbent recovery is attained.

Figure 11:
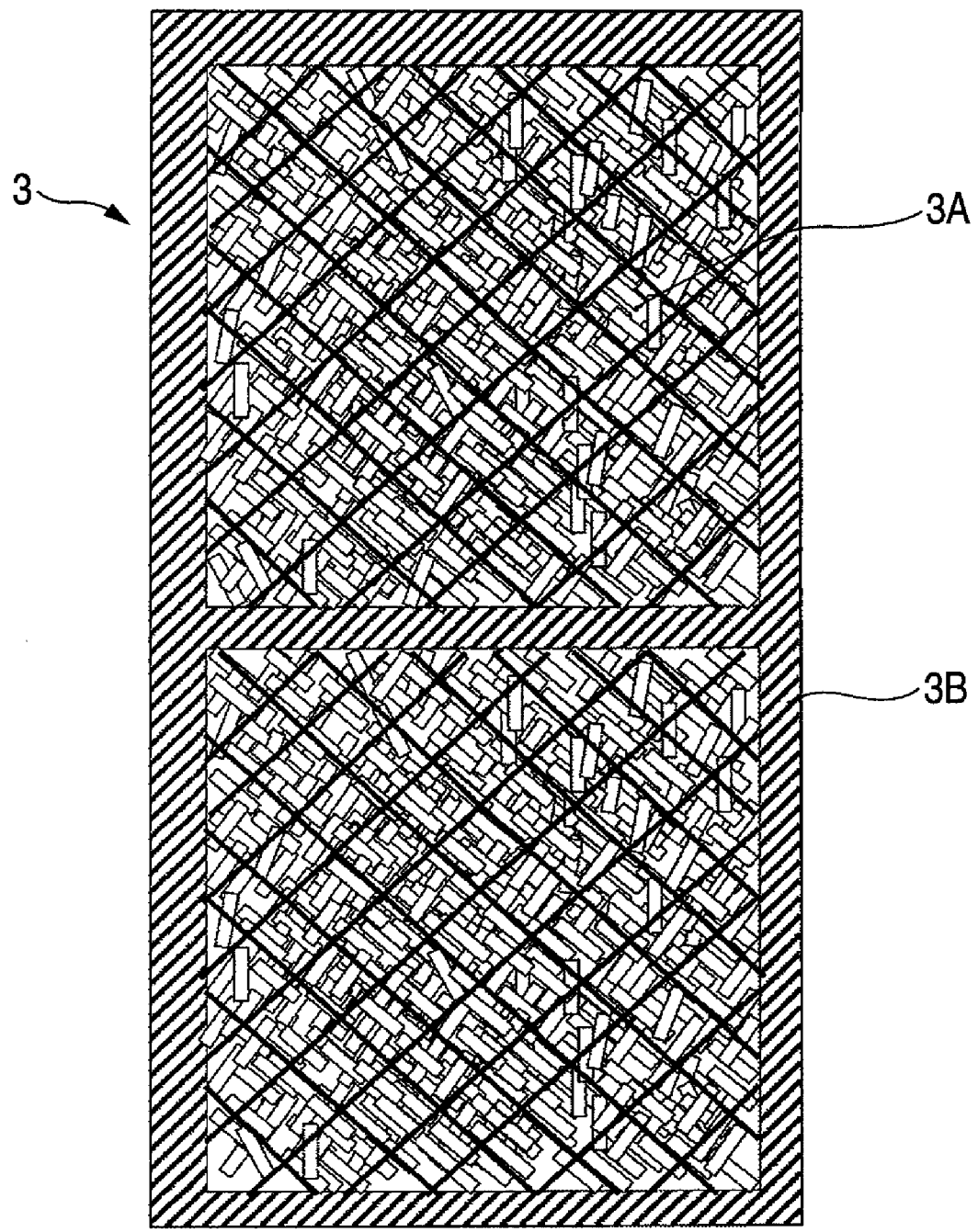
FIG. 11 A drawing showing another absorption unit according to Embodiment 1 of the invention.

The same effect is attained by an absorption unit 3 wherein particles in the form of a powder, sphere, or a column are housed as shown in FIG. 11 in addition to the absorbent in which the absorbent such as the hydrophobic zeolite is deposited on the honeycomb.

Also, it is possible to increase the decomposition efficiency by reducing the energy required for decomposition by mixing a noble metal catalyst such as platinum, palladium, rhodium, and silver, which are noble metals, to the absorbent.

Further, when a reaction speed of toluene which is a representative substance of the volatile organic compounds and oxygen atoms is compared with a reaction speed of toluene and ozone, the reaction speed of the toluene and ozone is represented by $k=5.23\times10^{-12}\times(T/298)^{1.21}\times\exp(-6713.5/T)$ cm$^3$/(molecule·s)) (T: reaction temperature), and the reaction speed at 25° C. is $3.89\times10^{-22}$ cm$^3$/(molecule·s) according to J. Phys. Chem. 89, 1982 (1985), Toby, S. et al., "Kinetics and chemiluminescence of ozone-aromatic reactions in the gas phase." According to J. Phys. Chem. Ref. Data 23, 847-1033 (1994), Baulch, D. L. et al., "Evaluated kinetic data for combustion modeling—Supplement I", the reaction speed of toluene and oxygen atoms is represented by $k=5.23\times10^{-12}\times(T/298)^{1.21}\times\exp(-1261.13/T)$ cm$^3$/(molecule·s)), and the reaction speed at 25° C. is $7.62\times10^{-14}$ cm$^3$/(molecule·s). Therefore, the reaction speed of toluene and oxygen atoms is about 5,800 times higher than that of the toluene and ozone.

Accordingly, in order to efficiently decompose toluene, it is desirable to react toluene with the oxygen atoms generated by the decomposition of ozone than to react toluene with the ozone generated by the discharge. Since the oxygen atoms have short life, it is preferable to decompose the ozone generated by the discharge in the vicinity of the absorbent in order to cause the reaction between the oxygen atoms and the volatile organic compounds. Therefore, it is effective to place the ozone decomposition catalyst in the vicinity of the absorbent in which the volatile organic compounds are concentrated. As the ozone decomposition catalyst, it is effective to use manganese, nickel, titania, copper, iron, cobalt, and oxides thereof, and it is possible to increase the probability of the collision and decomposition of organic compounds on the absorbent with the short life oxygen atoms by depositing the powder of the ozone decomposition catalyst on the absorbent, thereby further improving the decomposition efficiency.

It is possible to achieve the effect of promoting the decomposition of volatile organic substance by mixing particles of the hydrophobic zeolite for absorbing volatile organic substance, the noble metal catalyst, and the ozone decomposition catalyst. However, since the life of the oxygen atoms is several microseconds, which is short, particles of the noble metal or the ozone decomposition catalyst or a combination thereof are deposited on the hydrophobic zeolite in the case of decomposing the volatile organic compounds with the use of the oxygen atoms. Since it is possible to use such hydrophobic zeolite for the decomposition before the oxygen atoms are changed into oxygen molecules or other molecules, it is possible to efficiently decompose the volatile organic compounds.

Figure 12:
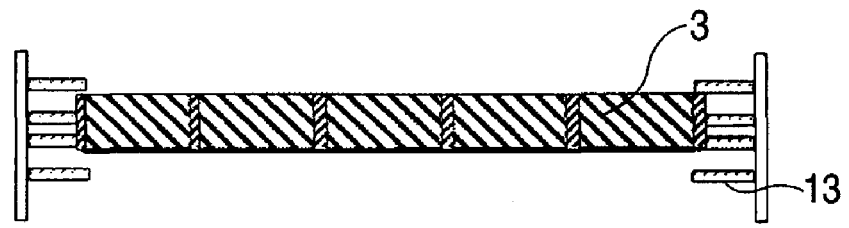
FIG. 12 A drawing showing a gas sealing structure according to Embodiment 1 of the invention.
Figure 12:
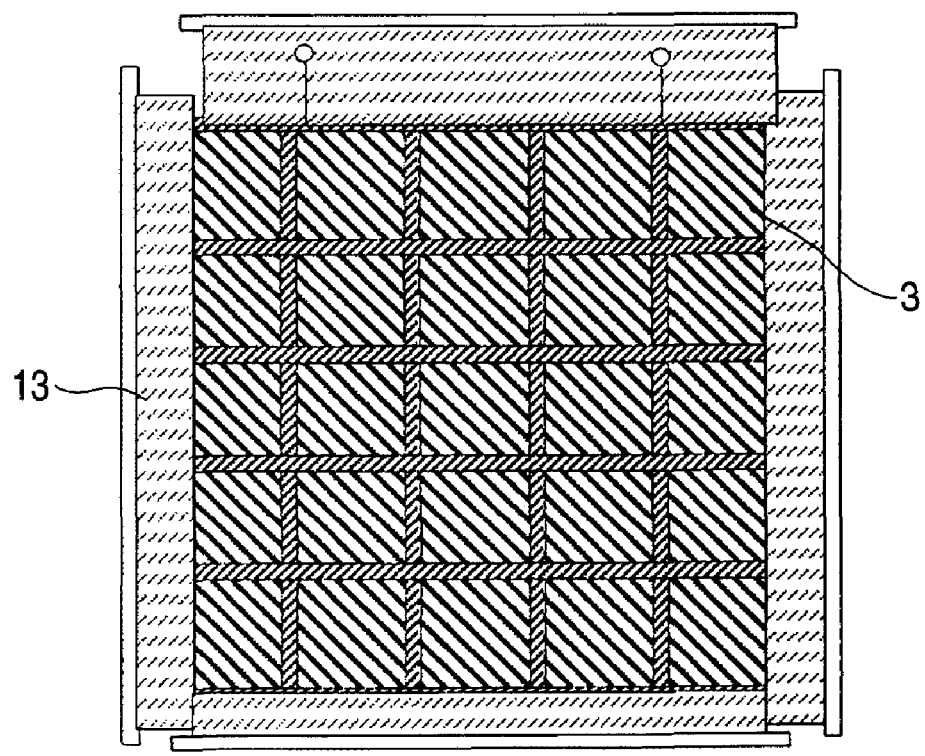
Figure 13:
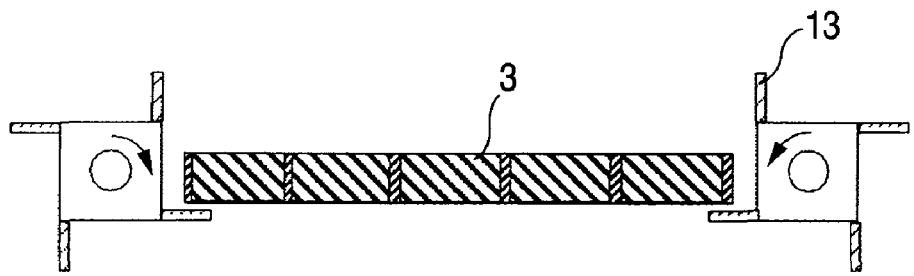
FIG. 13 A drawing showing another gas sealing structure according to Embodiment 1 of the invention.
Figure 13:
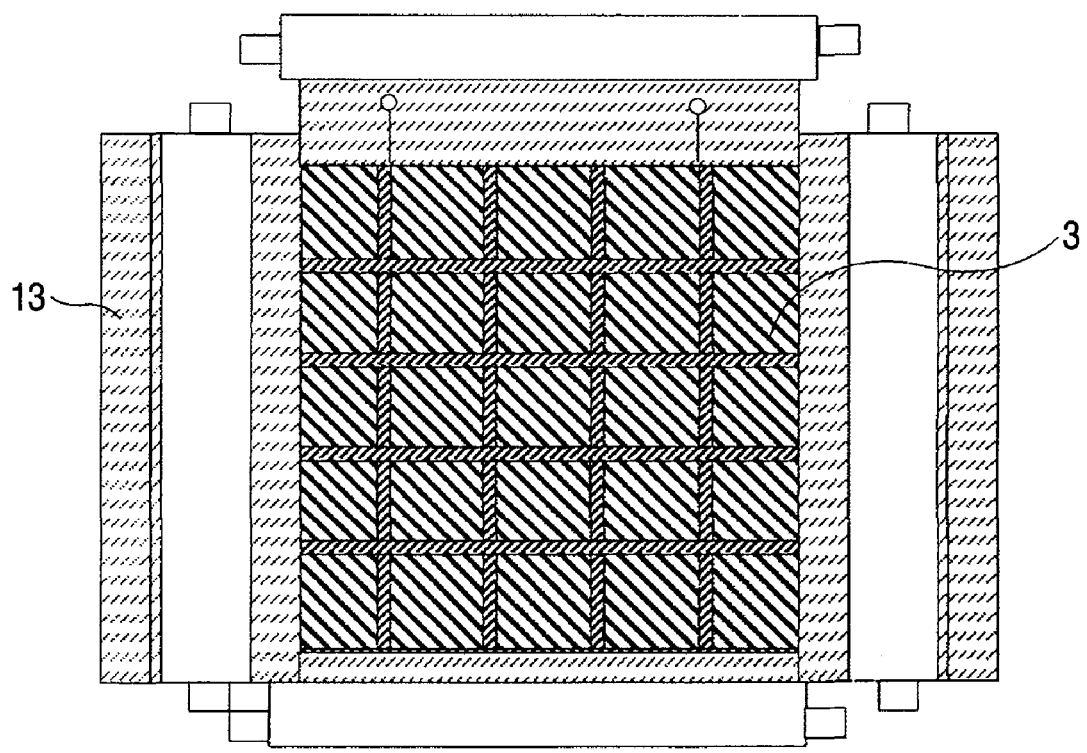
Figure 14:
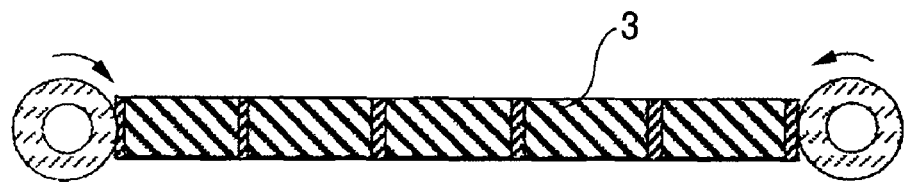
FIG. 14 A drawing showing another gas sealing structure according to Embodiment 1 of the invention.
Figure 14:
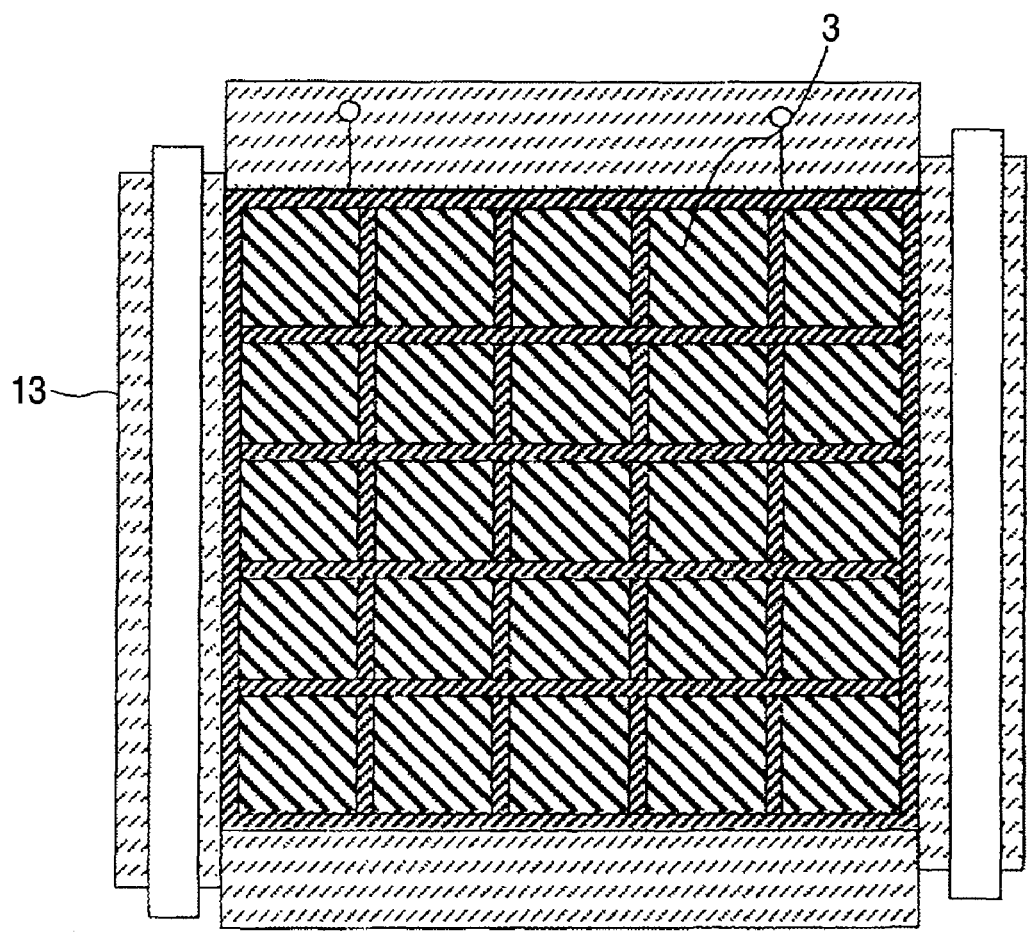
Figure 15:
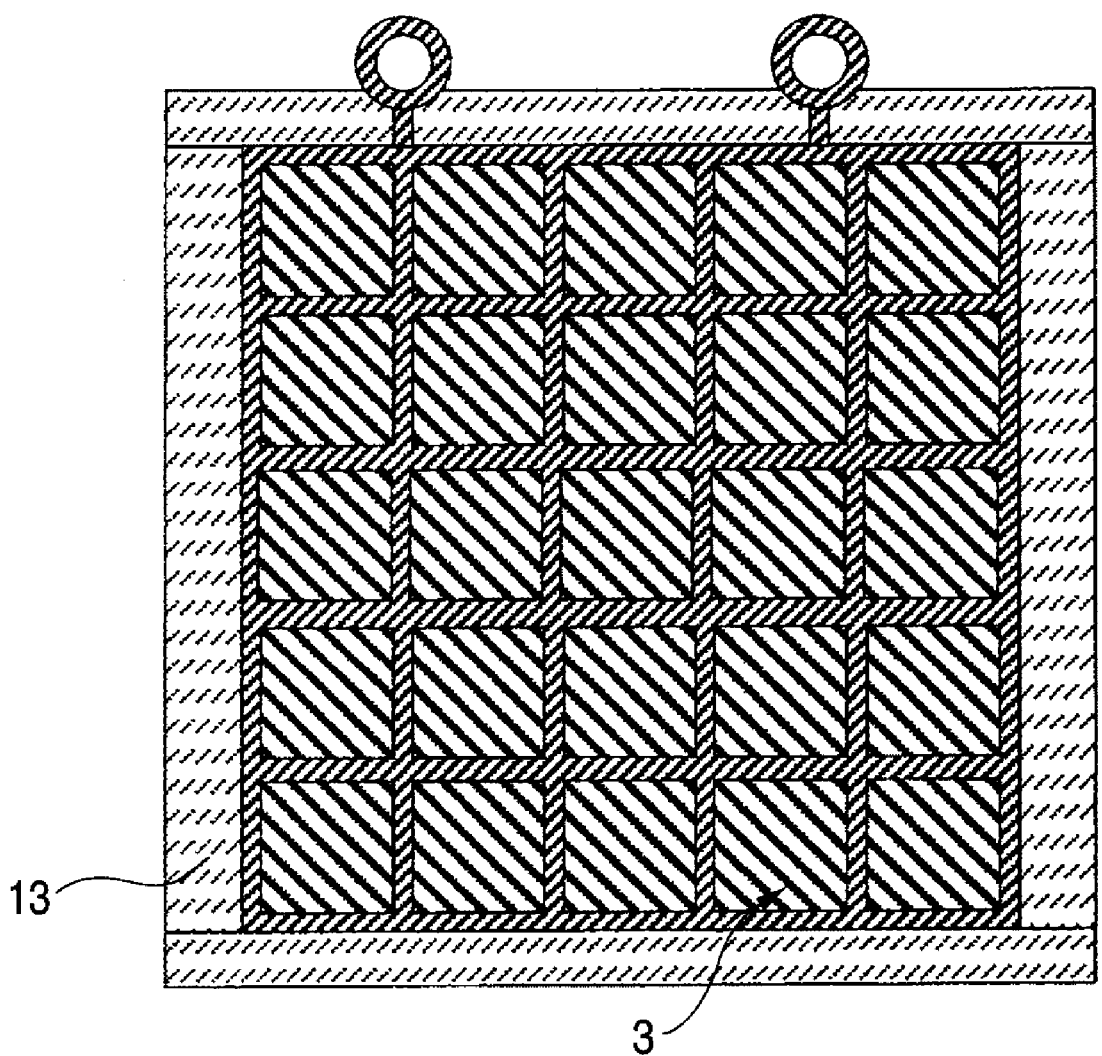
FIG. 15 A drawing showing another gas sealing structure according to Embodiment 1 of the invention.

The sealing plate 13 for preventing the gas from passing through without contacting the absorbent is a plate which is made from an elastic silicon rubber or the like and attached to a wall surface of a vessel as shown in FIG. 12. Also, it is possible to prevent the gas from leakage by using a rotatable sealing plate which is disposed on an outer periphery, i.e. on each of four sides of the absorbent units 3, as shown in FIG. 13 as the sealing plate 13. Also, a sealing plate wound around each of rollers as shown in FIG. 14 may be used as the sealing plate 13. In the system of FIGS. 13 and 14, since the sealing plate rotates during the transfer to reduce the gas leakage and friction, it is possible to easily realize the structure. Also, it is possible to achieve the same effect by attaching the sealing plate attached to the periphery of the absorption unit as shown in FIG. 15.

As described in the foregoing, although it has been necessary to recover and treat the absorbent that has not reached to the absorption breakdown together with other absorbents in the conventional technologies, it is possible to treat the VOC high in concentration ratio after absorption breakdown according to the invention, thereby providing an efficient apparatus. Also, since the number of required discharge units is reduced, it is possible to realize an economical apparatus.

Embodiment 2

FIGS. 16 to 19 are diagrams showing a VOC treatment apparatus according to Embodiment 2 of the invention. In Embodiment 2, a mode of the recovery treatment chamber 2 for recovering the absorbent after the absorption is different from that of Embodiment 1, and other component parts of Embodiment 2 are the same as those of Embodiment 1. Therefore, descriptions for the component parts other than the recovery treatment chamber are omitted. In Embodiment 2, the absorption units 3 are housed in the absorption recovery treatment chamber 2, and the recovery treatment chamber 2 is transferred.

Figure 16:
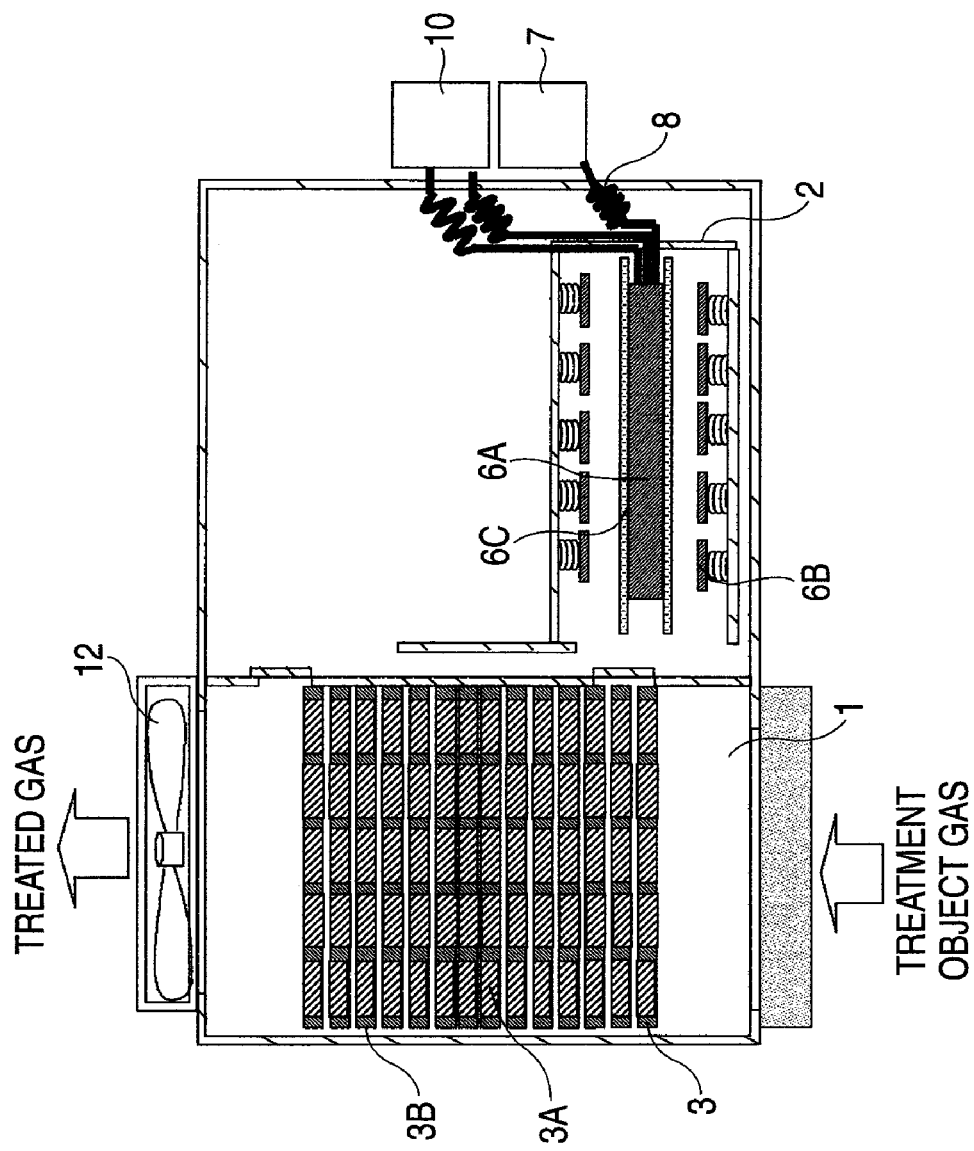
FIG. 16 A drawing showing a treatment operation of a volatile organic compound treatment apparatus according to Embodiment 2 of the invention.
Figure 17:
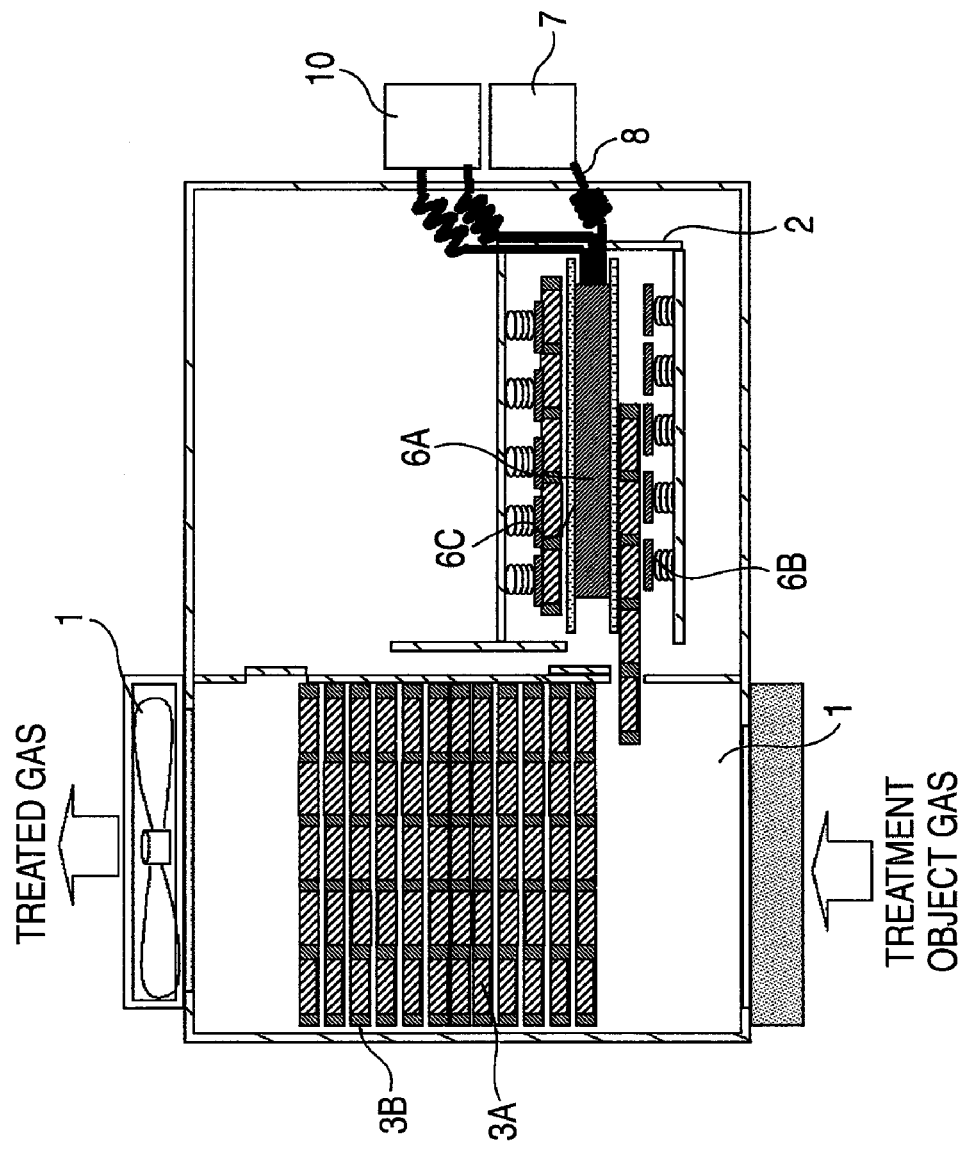
FIG. 17 A drawing showing the treatment operation of a volatile organic compound treatment apparatus according to Embodiment 2 of the invention.
Figure 18:
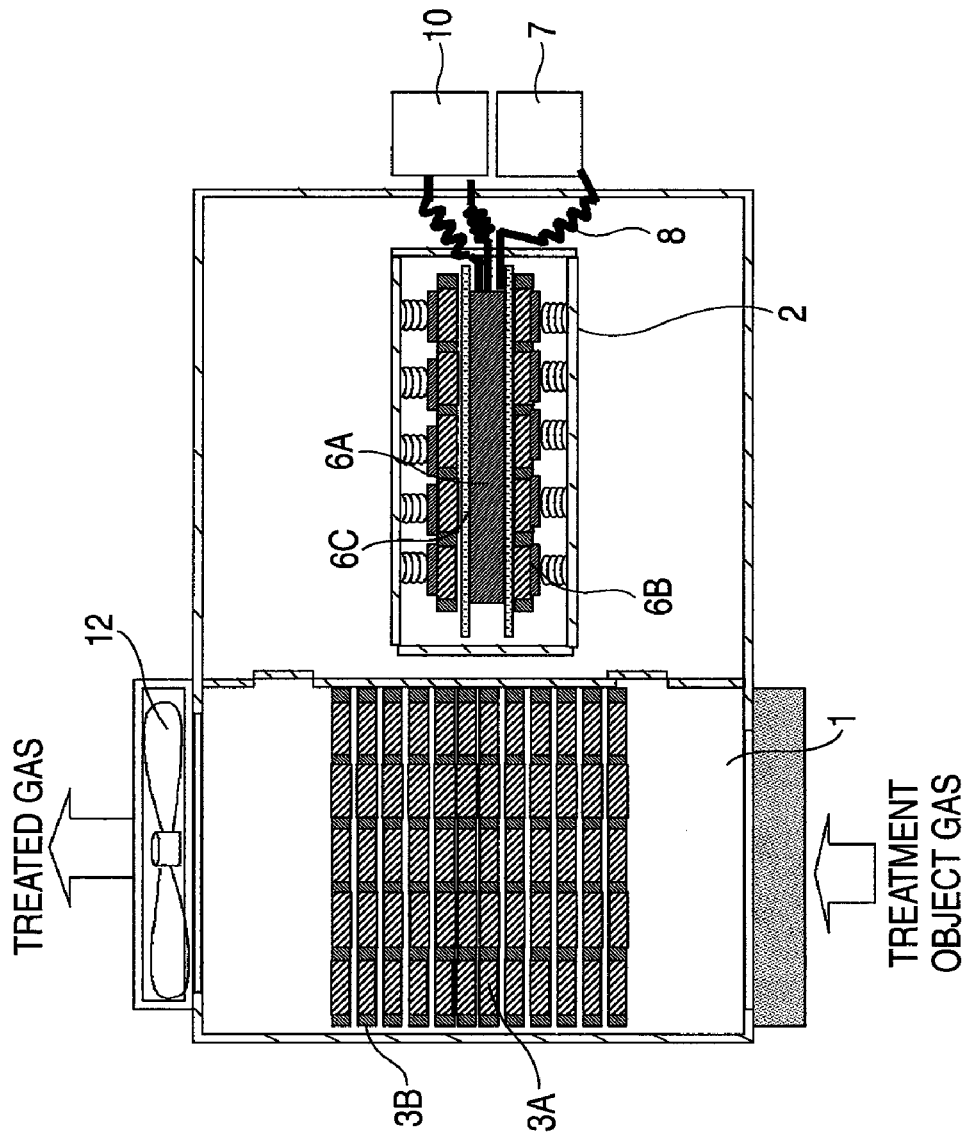
FIG. 18 A drawing showing the treatment operation of a volatile organic compound treatment apparatus according to Embodiment 2 of the invention.

FIG. 16 is a diagram showing a state wherein the absorption units 3 are not present in the absorption recovery treatment chamber. In the same manner as in Embodiment 1, the absorption units 3 that reached to the absorption breakdown in the absorption treatment chamber are sequentially sent to the recovery treatment chamber 2 from the one disposed at the upstream side of the gas flow. After the absorption unit 3 is disposed between the high voltage electrode 6A and the ground electrode 6B and the dielectric 6C made from a glass or a ceramic and existing between the high voltage electrode 6A and the ground electrode 6B, the ground electrode 6B moves to sandwich the absorbents. In this state, a distance between the dielectric 6C and the ground electrode 6B, i.e. the discharge gap length, is kept constant by a force of spring or the like. The discharge treatment chamber moves after the absorption unit 3 is set, and the treatment chamber is tightly closed by a cover fixed in the treatment chamber in advance of the setting of the absorption unit 3 as shown in FIG. 18. After the closure, a high voltage is applied to the high voltage electrode to generate plasma.

Figure 19:
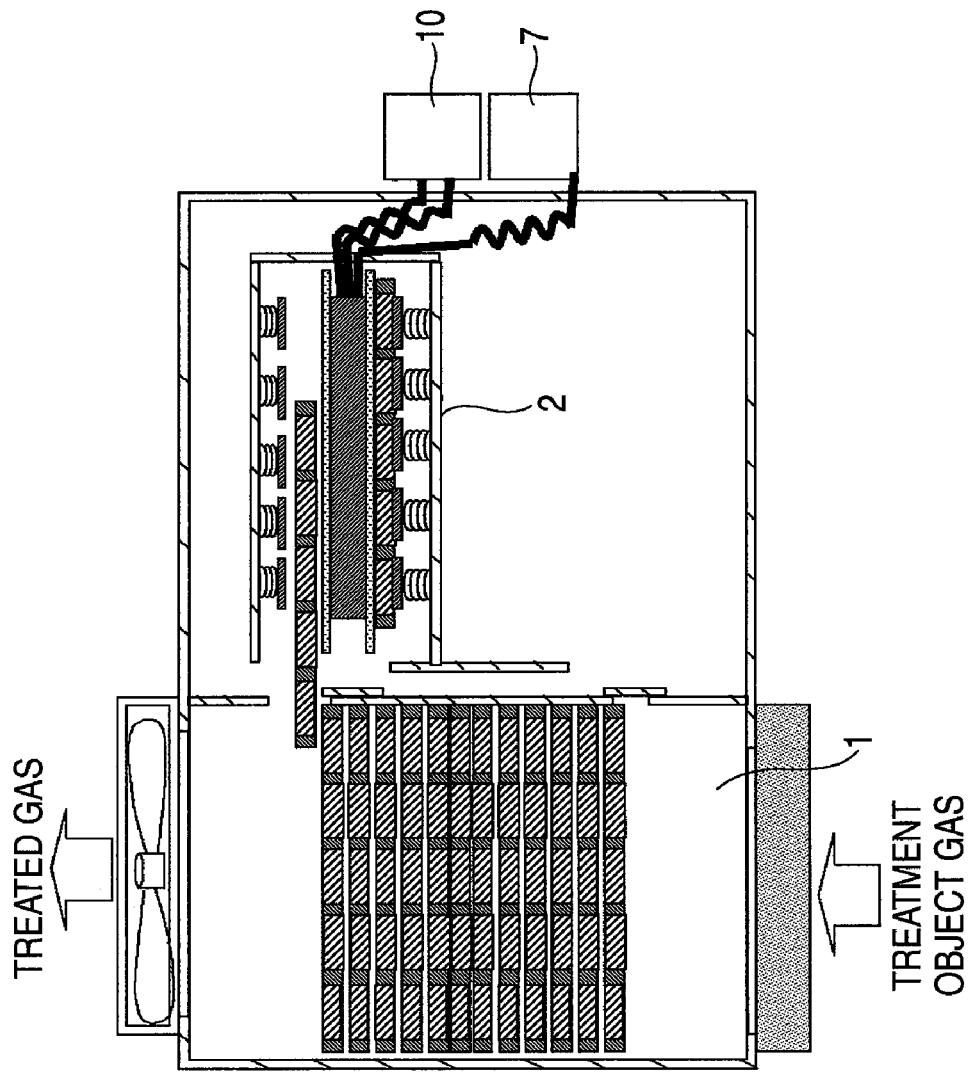
FIG. 19 A drawing showing the treatment operation of a volatile organic compound treatment apparatus according to Embodiment 2 of the invention.

The principle of the VOC decomposition by the discharge is as described in the foregoing. Also, since the closed space is formed of the absorption treatment chamber 2 and the cover in Embodiment 2, it is unnecessary to form a closed space by the frame 3B, the dielectric 6C, and the ground electrode 6B of the absorption unit 3. After termination of the absorbent recovery by discharge, the absorption unit 3 is returned to the absorption treatment chamber as shown in FIG. 19 to be placed at the position that is the most leeward of the gas flow.

In Embodiment 2, since it is possible to treat the VOC of high concentration after the absorption breakdown as in Embodiment 1, an efficient apparatus is provided. Since the number of required discharge units is reduced, it is possible to realize an economical apparatus.

Figure 20:
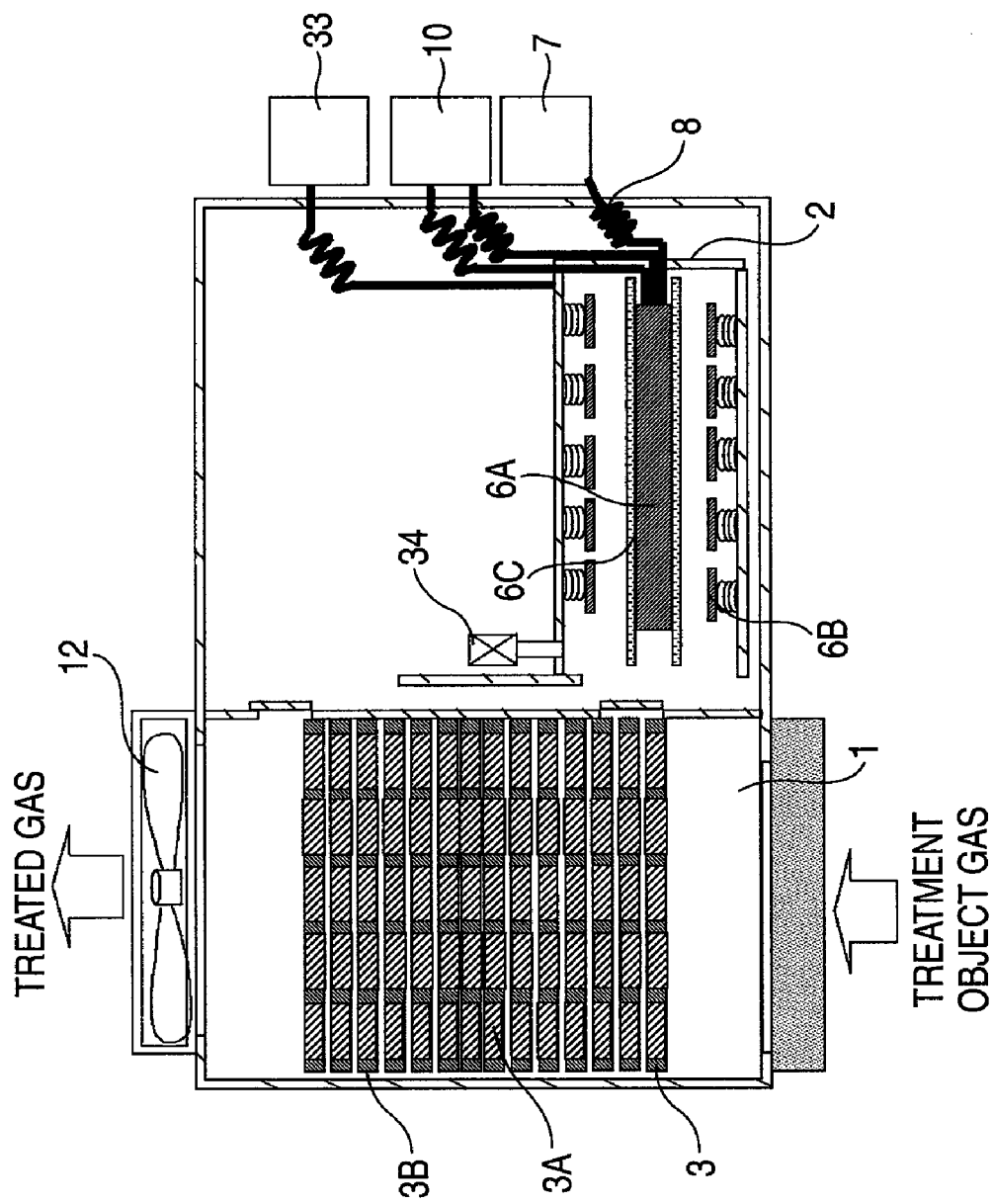
FIG. 20 A drawing showing a modification example of the treatment operation of a volatile organic compound treatment apparatus according to Embodiment 2 of the invention.

FIG. 20 is a diagram showing a VOC treatment apparatus that is obtainable by adding an oxygen generation device 33 and a pressure adjuster 34 to the VOC treatment apparatus of FIG. 16. By adding the oxygen generation device 33 and the pressure adjuster 34, it is possible to supply oxygen from the oxygen generation device to the absorbent recovery treatment chamber 2 at the time point when the absorption unit is housed in the absorbent recovery treatment chamber 2. In this case, the method of supplying oxygen may be either one of intermittent supply or a continuous supply. By supplying oxygen, a voltage for generating the discharge becomes larger when a pressure inside the absorbent recovery treatment chamber is increased. Therefore, it is necessary to keep the pressure to an atmospheric pressure by using the pressure adjuster 34.

As described in the foregoing, the volatile organic compounds are decomposed by the oxygen atoms or ozone that generate oxygen in the air by the discharge. Therefore, it is possible to enhance the decomposition efficiency by increasing the oxygen concentration which is achieved by adding the oxygen generation device 33 and the pressure adjuster 34 and supplying oxygen.

Embodiment 3

Figure 21:
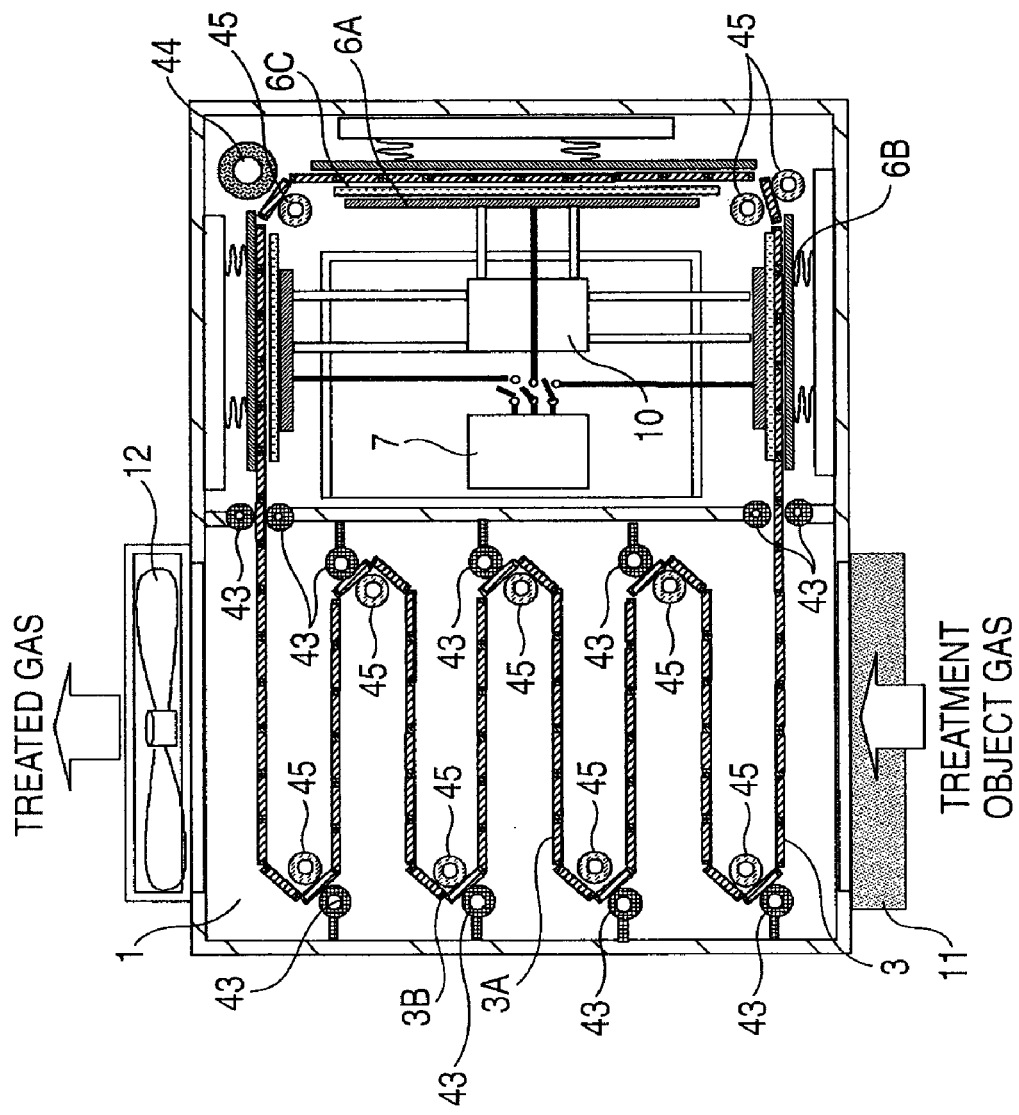
FIG. 21 A drawing showing a treatment operation of a volatile organic compound treatment apparatus according to Embodiment 3 of the invention.

FIG. 21 is a schematic diagram showing a VOC treatment apparatus according to embodiment 3. Referring to FIG. 21, a rotor 43 serves as a sealing and a guide for absorption unit transfer. A driving rotor 44 for transferring the absorption unit and a transfer rotor 45 for transferring the absorption unit 3 which does not have any driving system are provided.

In Embodiment 3, the absorption units 3 are connected as one piece. By rotating the driving rotor 44, the series of absorption units 3 are transferred from the absorption treatment chamber 1 to the absorbent recovery treatment chamber 2, and the absorbents that have been subjected to the VOC decomposition/recovery by discharge are returned to the absorption treatment chamber. The absorbent disposed at the most upstream position at which the gas flows in firstly reaches to the absorption breakdown. A row of the absorption units 3 after the absorption breakdown is transferred to the absorbent recovery treatment chamber. After the transfer, the switching element is turned on to start the discharge. The discharge conditions and the principle of VOC decomposition are as described in the foregoing.

The space enclosed by the frame 3B of the absorption unit 3, the dielectric 6C, and the ground electrode 6B is a closed space in the same manner as in Embodiment 1. In a state where the discharge is applied when the switching element is in the ON-state, a temperature inside the space and temperatures of the high and ground electrodes and the dielectric are raised due to heat generated by the discharge. As is the case with the foregoing embodiments, though the temperature rise is desirable since VOC absorbed by the absorbent are desorbed due to the temperature rise to be readily subjected to the discharge, efficiency is deteriorated due to insulation breakdown and an increase in tan δ when the temperature of the dielectric exceeds 100° C. Therefore, the temperature of the dielectric is cooled to about 100° C. by supplying a pure water to the chiller. In this embodiment, since it is possible to treat the VOC increased in concentration ratio after the absorption breakdown as in Embodiments 1 and 2, it is possible to provide an efficient apparatus. It is possible to realize an economical apparatus due to the reduced number of required discharge units. Also, it is possible to obtain a volatile organic substance removing apparatus wherein the transfer of the absorption units is easy.

Embodiment 4

Figure 22:
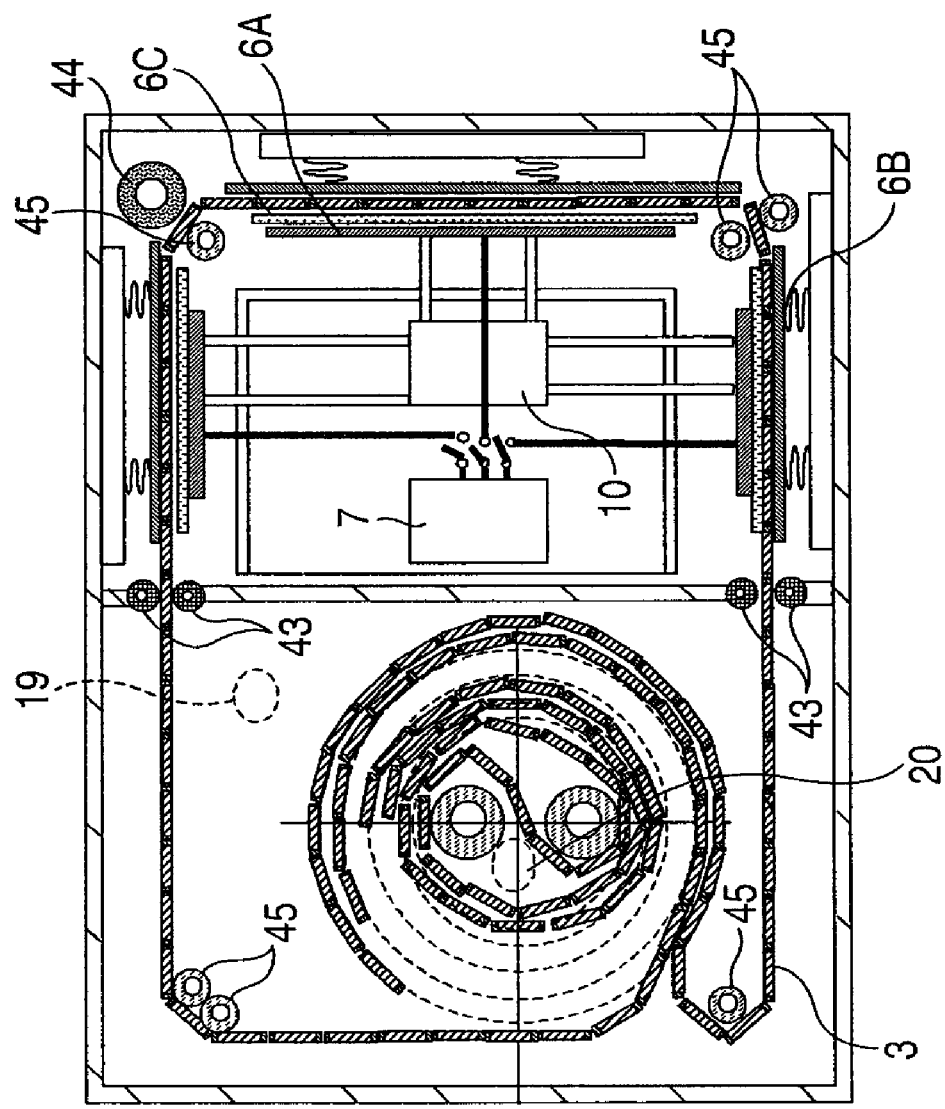
FIG. 22 A drawing showing a treatment operation of a volatile organic compound treatment apparatus according to Embodiment 4 of the invention.
Figure 23:
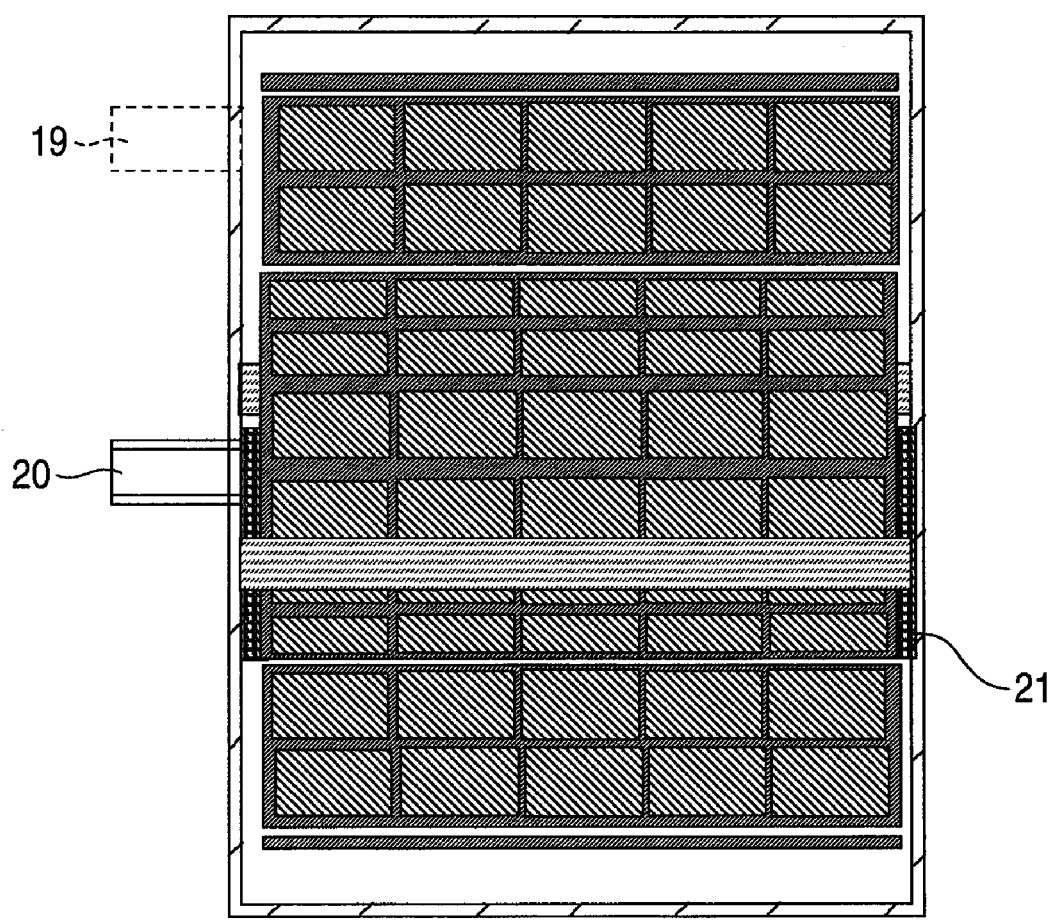
FIG. 23 A drawing showing the treatment operation of a volatile organic compound treatment apparatus according to Embodiment 4 of the invention.

FIG. 22 is a schematic diagram showing a VOC treatment apparatus according to Embodiment 4 of the invention, and FIG. 23 is a horizontal sectional view of the apparatus. Referring to FIGS. 22 and 23, the absorption units 3 are connected to one another. The absorption units 3 are wound in the form of a spiral so that the absorption units 3 are transferred by a series of movements from the absorption treatment chamber 1 to the absorbent recovery treatment chamber for the absorption treatment and the decomposition and recovery treatment. An air supply inlet 19 and an exhaust outlet 20 are provided in the absorption treatment chamber 1, wherein the air supply inlet 19 is disposed so as to supply the gas to the outside of the spirally wound absorption units 3, and the exhaust outlet 20 is disposed inside the spirally wound absorption units 3. A shielding plate 21 is disposed so as to prevent the gas from flowing between the spirally wound absorption unit 3 and the absorption treatment chamber 1.

The outlet is connected to a fan, and a gas component of the VOC treatment apparatus exhausted by the fan is drawn in from the air supply inlet 19 as the treatment object gas. From the treatment object gas drawn into the VOC treatment apparatus, a VOC component is absorbed by the absorbents 3A when the treatment object gas is flowing from an outer periphery of the spirally wound absorption units 3 to an inner periphery of the spirally wound absorption units 3, so that the treatment object gas is exhausted as a clean air. In this apparatus, the absorption units 3 are transferred by winding the absorption units 3 in the spiral form and rotating a driving rotor 44. The absorption unit moving toward a central part and having a low absorption amount and the absorption unit moving from the central part to the outer periphery and having a high absorption amount are alternated. The absorption unit that is transferred to the decomposition recovery treatment chamber is high in VOC absorption amount.

Embodiment 5

Figure 24:
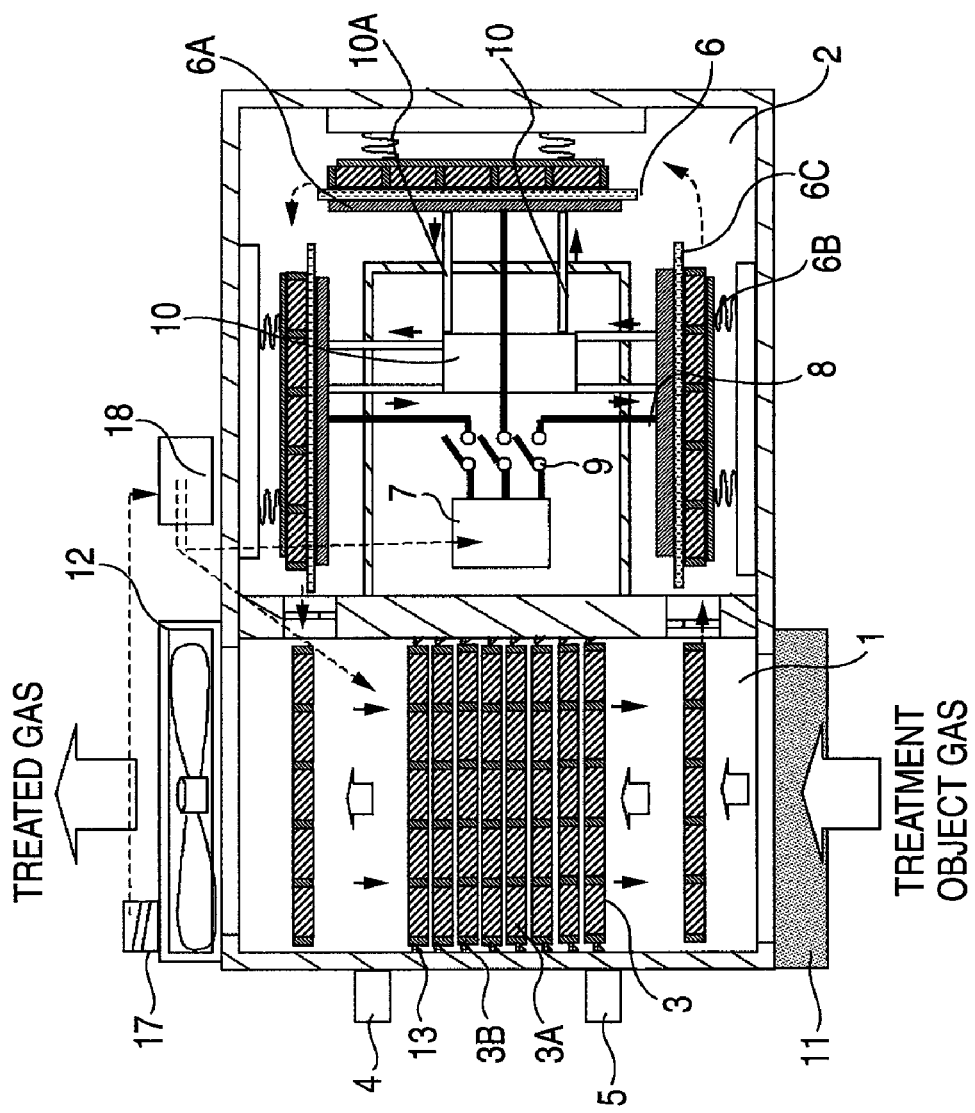
FIG. 24 A drawing showing a treatment operation of a volatile organic compound treatment apparatus according to Embodiment 5 of the invention.

FIG. 24 is a schematic diagram showing a VOC treatment apparatus according to Embodiment 5 of the invention. Embodiment 5 is provided with a sensor 17 for measuring VOC contained in a treated gas. Since other component parts of Embodiment 5 are the same as those of Embodiment 1, description thereof are omitted. In Embodiment 5, the VOC contained in the treated gas are continuously monitored by the sensor 17. When a concentration of the VOC contained in the treated gas reaches to a predetermined value, a control signal is generated from the control device 18 in accordance with a signal from the sensor 17 to move the absorption units 3. Depending on an amount of VOC absorbed by the absorbents 3A, electric power to be supplied by a discharge is controlled.

With this system, since it is possible to continuously keep the VOC contained in the exhaust gas to the predetermined amount or less as well as to maintain the absorption amount of the absorbent to a constant value, it is possible to efficiently treat VOC without consuming unnecessary electric power.

Though the VOC sensor is disposed only at the outlet of the treatment apparatus in FIG. 24, the position at which the VOC sensor is to be disposed may be the inlet of the VOC treatment apparatus. The same effect is attained by automatically calculating a transfer time from an inlet concentration that is obtained from a relationship between the inlet concentration and an absorption time or an absorption amount stored in advance of the calculation and by transferring the absorption units and controlling the discharge power by way of the control unit. Further, when the cost permits, it is possible to monitor the inlet concentration and the outlet concentration when the VOC sensor is attached to each of the inlet side and the outlet side, thereby making it possible to monitor the VOC absorption amount of the absorbent. With such constitution, it is possible to control with higher accuracy than the case of monitoring the VOC concentration of only one of the inlet and the outlet.

Embodiment 6

Figure 25:
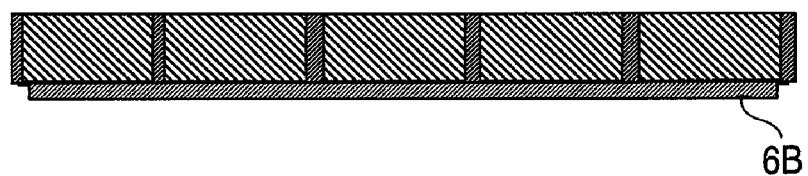
FIG. 25 A drawing showing a structure of an absorption unit according to Embodiment 6 of the invention.
Figure 25:
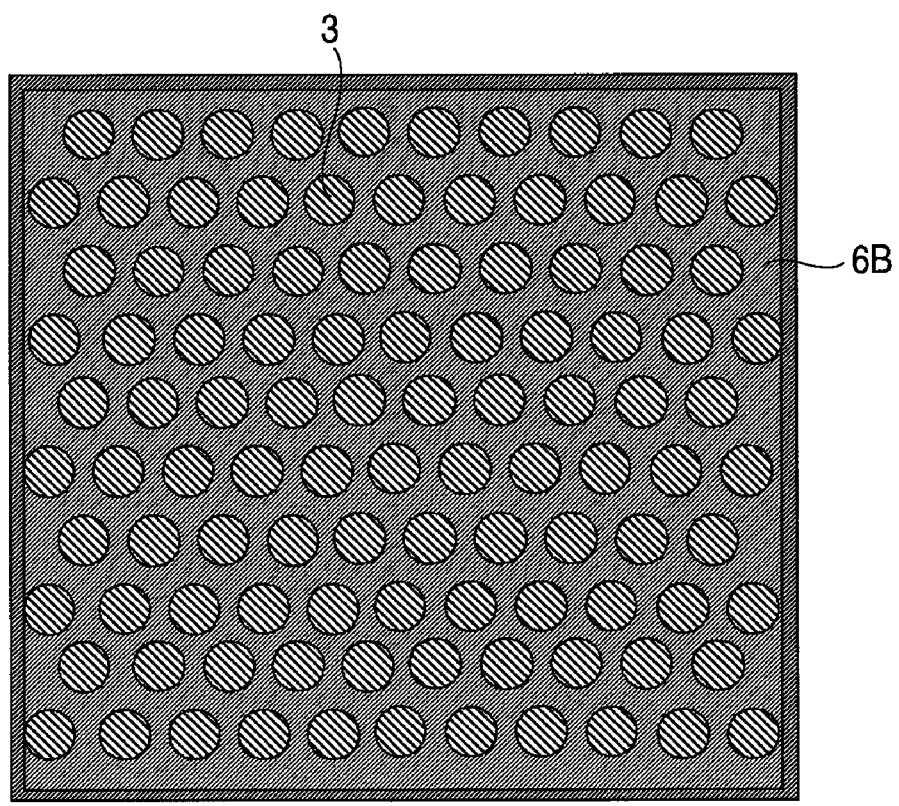
Figure 26:
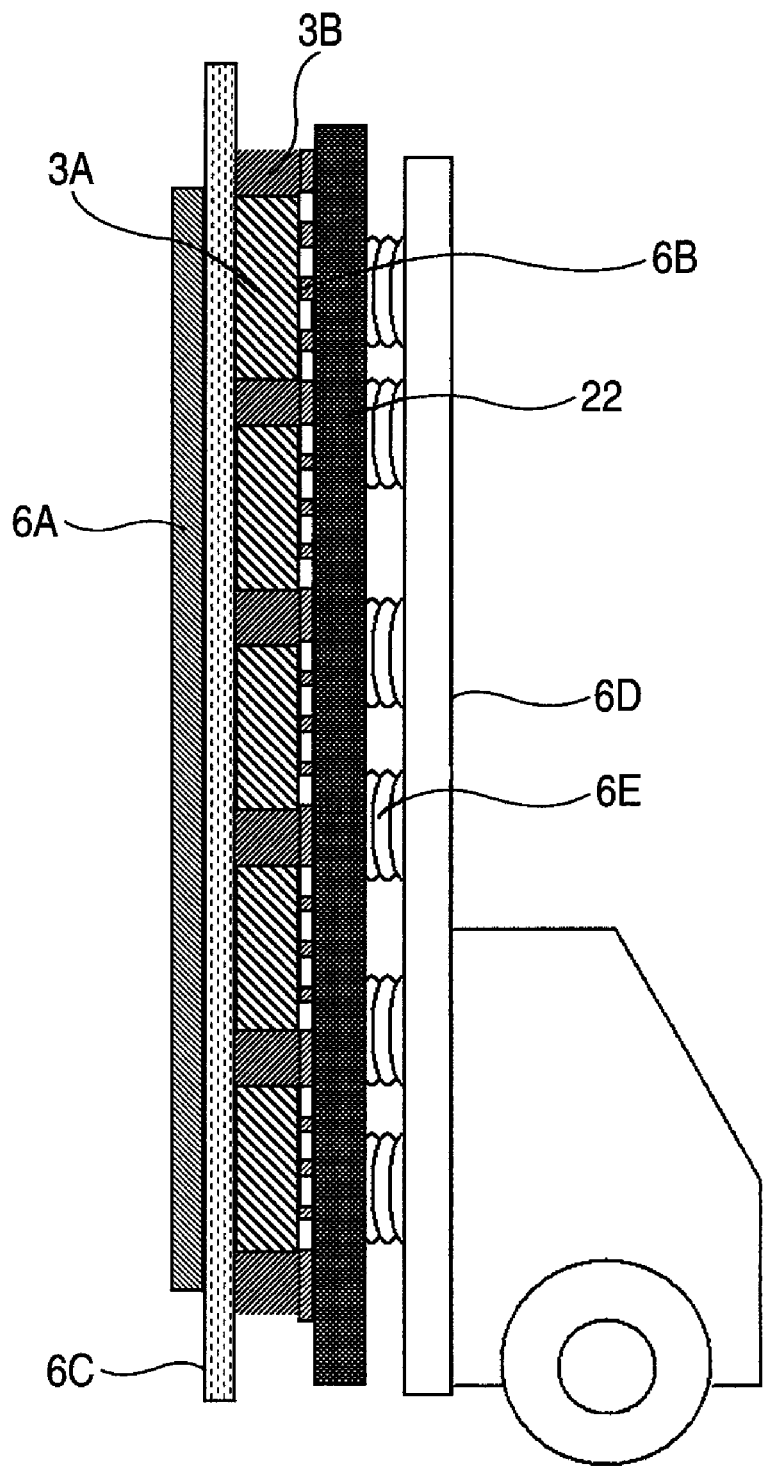
FIG. 26 A drawing showing a structure of a volatile organic compound treatment apparatus during an absorption unit recovery according to Embodiment 6 of the invention.

In the foregoing embodiments, the absorption unit 3 is formed of the absorbents 3A and the frames 3B. In Embodiment 6, the absorption unit 3 is integrated with the ground electrode 6B as shown in FIG. 25. Since the absorption unit 3 and the ground electrode 6B are integrated with each other, the ground electrode 6B functions as a reinforcing material of the absorption unit 3. Accordingly, it is possible to save weight since it is possible to make the frame thinner. Since it is necessary to flow the gas into the absorption treatment chamber 1, it is desirable that the ground electrode 6B has conductive property, such as a punching metal which is a metal plate having a hole and a wire gauze or a wire made from a metal. In this case, since the ground electrode has the holes, the gas can leak during the discharge. Therefore, it is necessary to provide a pressing plate 22 so as to maintain a uniform discharge gap length and to close the holes of the ground electrode as shown in FIG. 26.

Figure 27:
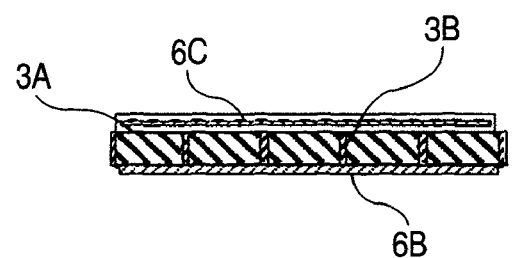
FIG. 27 A drawing showing a structure of another absorption unit according to Embodiment 6 of the invention.
Figure 27:
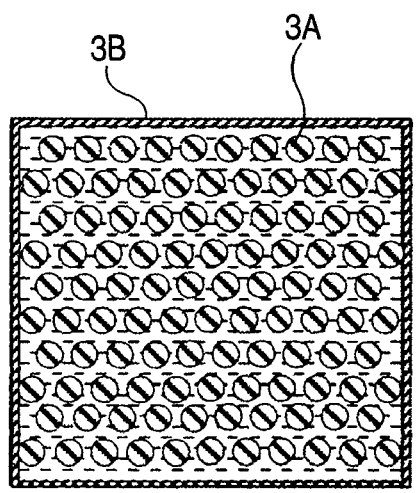
Figure 27:
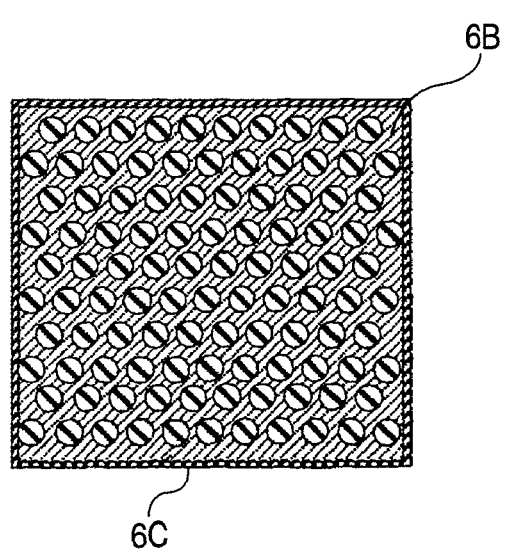

As shown in FIG. 27, the absorption unit 3 may be integrated by sandwiching the absorbent 3A between the grand electrode 6B and the dielectric 6C. According to this system, since the discharge gap is set in advance, the accuracy and uniform discharge can be performed. It is necessary to form holes in the ground electrode 6B and the dielectric 6C to allow the gas to flow in the absorption treatment chamber 1. Therefore it is preferable that the ground electrode has a conductive property such as a punching metal, a metal gauze or metal wire.

Figure 28:
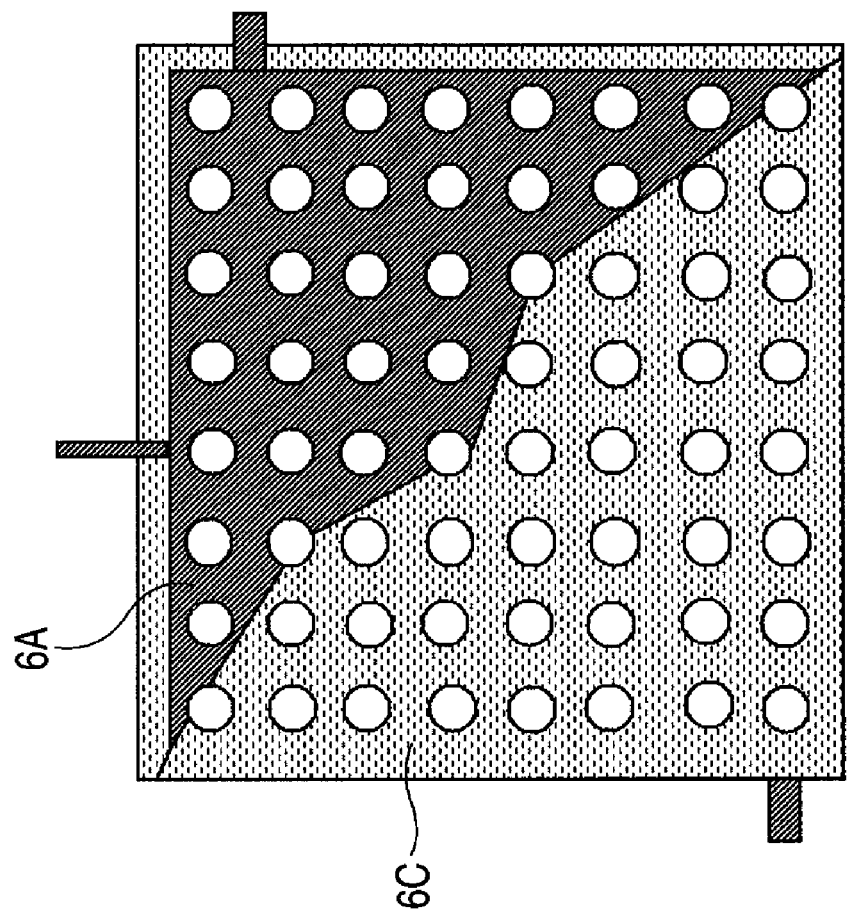
FIG. 28 A drawing showing a structure of another absorption unit according to Embodiment 6 of the invention.
Figure 29:
FIG. 29 A drawing showing a structure of another absorption unit according to Embodiment 6 of the invention.
Figure 29:
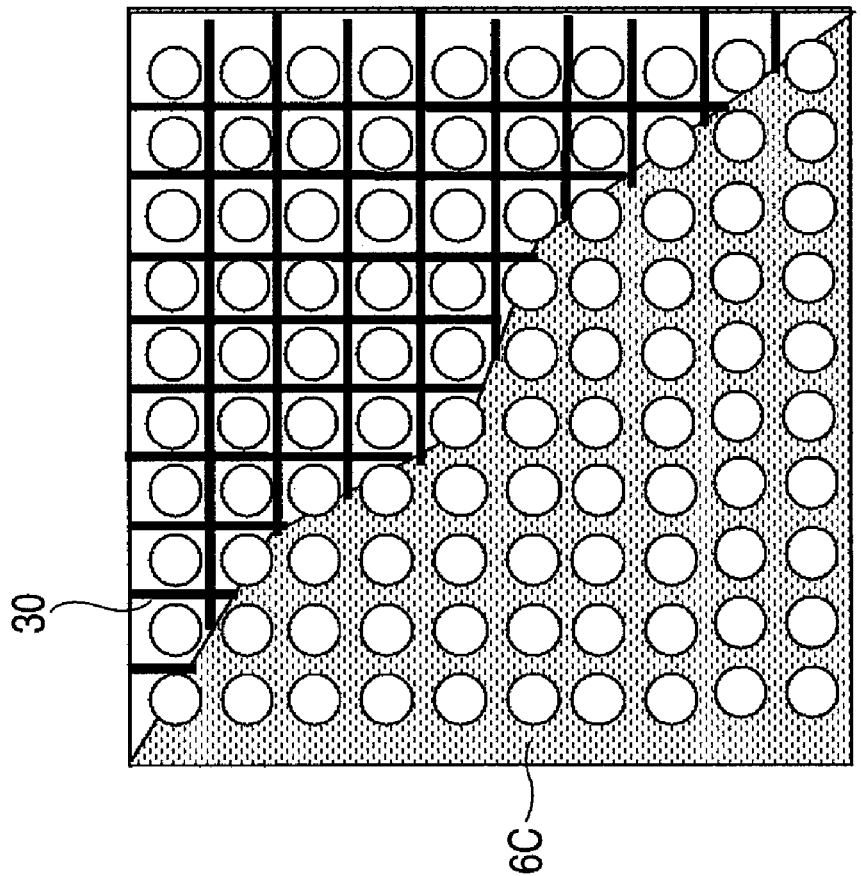

In the absorbent recovery treatment chamber 2, the discharge is generated by a contact with the cooled high voltage electrode. It is possible to reduce a contact resistance of the dielectric with the high voltage electrode by providing a power feeding layer by evaporating or plating gold, chromium, or nickel on a part contacting with the high voltage electrode, i.e, a surface reverse to the discharge surface. Also, in place of providing the conductive layer, the high voltage electrode 6A provided with the water-cooling unit may be coated with the dielectric as shown in FIG. 28 or a metal wire 30 or a punching metal may be embedded into the dielectric as shown in FIG. 29.

Figure 30:
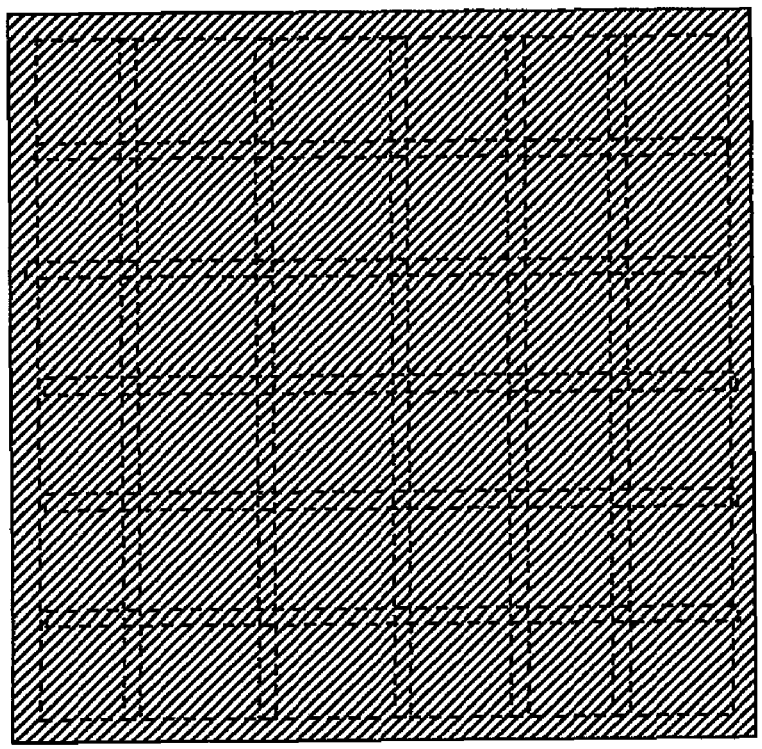
FIG. 30 A drawing showing a structure of another absorption unit according to Embodiment 6 of the invention.
Figure 30:
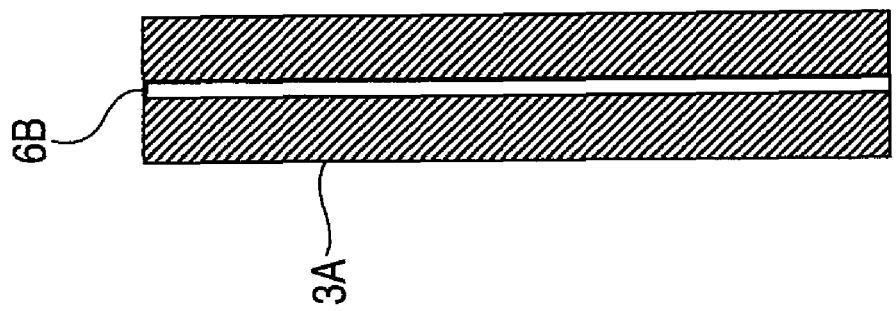

Further, as shown in FIG. 30, the absorption unit 3 may be formed by sandwiching the ground electrode 6B by the absorbents 3A. In this case, it is possible to cause the discharge on both of the surfaces of the ground electrode 6B when performing the discharge in the absorbent recovery treatment chamber 2.

Embodiment 7

Figure 31:
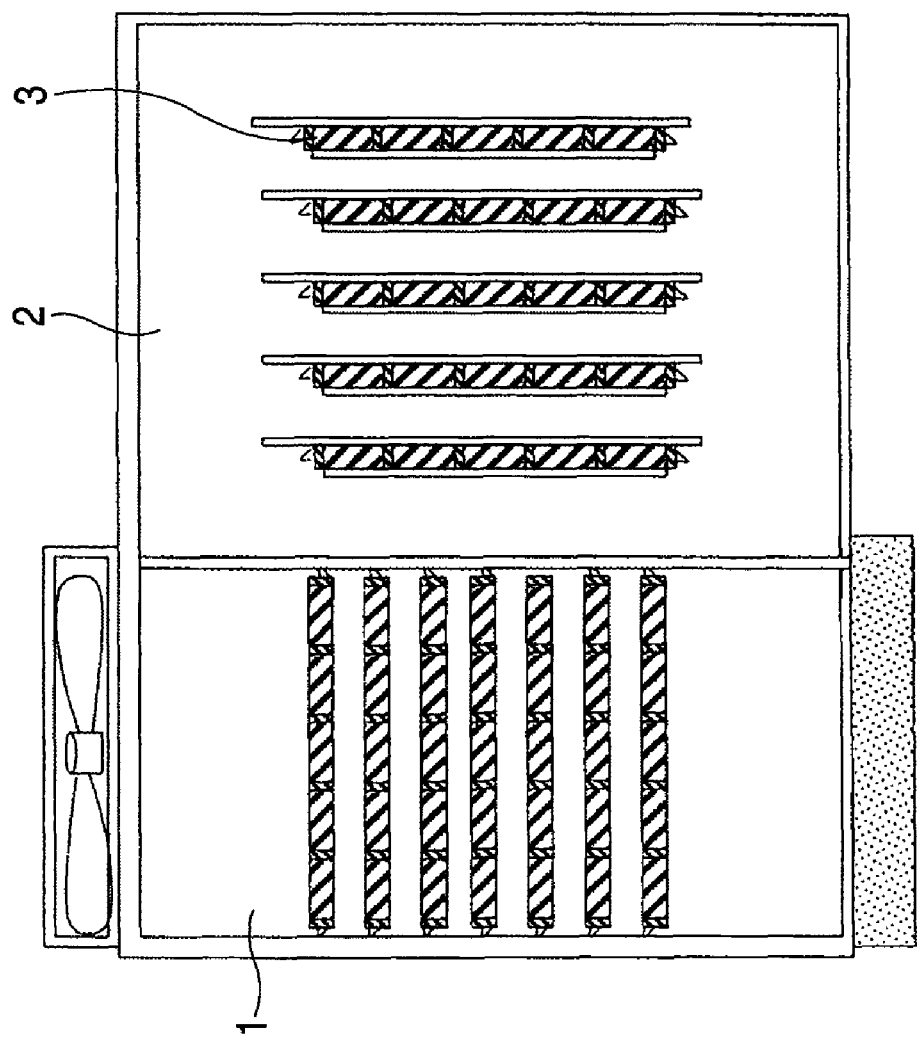
FIG. 31 A drawing showing a structure of a volatile organic compound treatment apparatus according to Embodiment 7 of the invention.

As shown in FIG. 31, the absorbents may be aligned in the form of a platform in the absorbent recovery treatment chamber 2. With such constitution, it is possible to freely decide the number of absorbents to be treated in the absorbent recovery treatment chamber 2.

Figure 32:
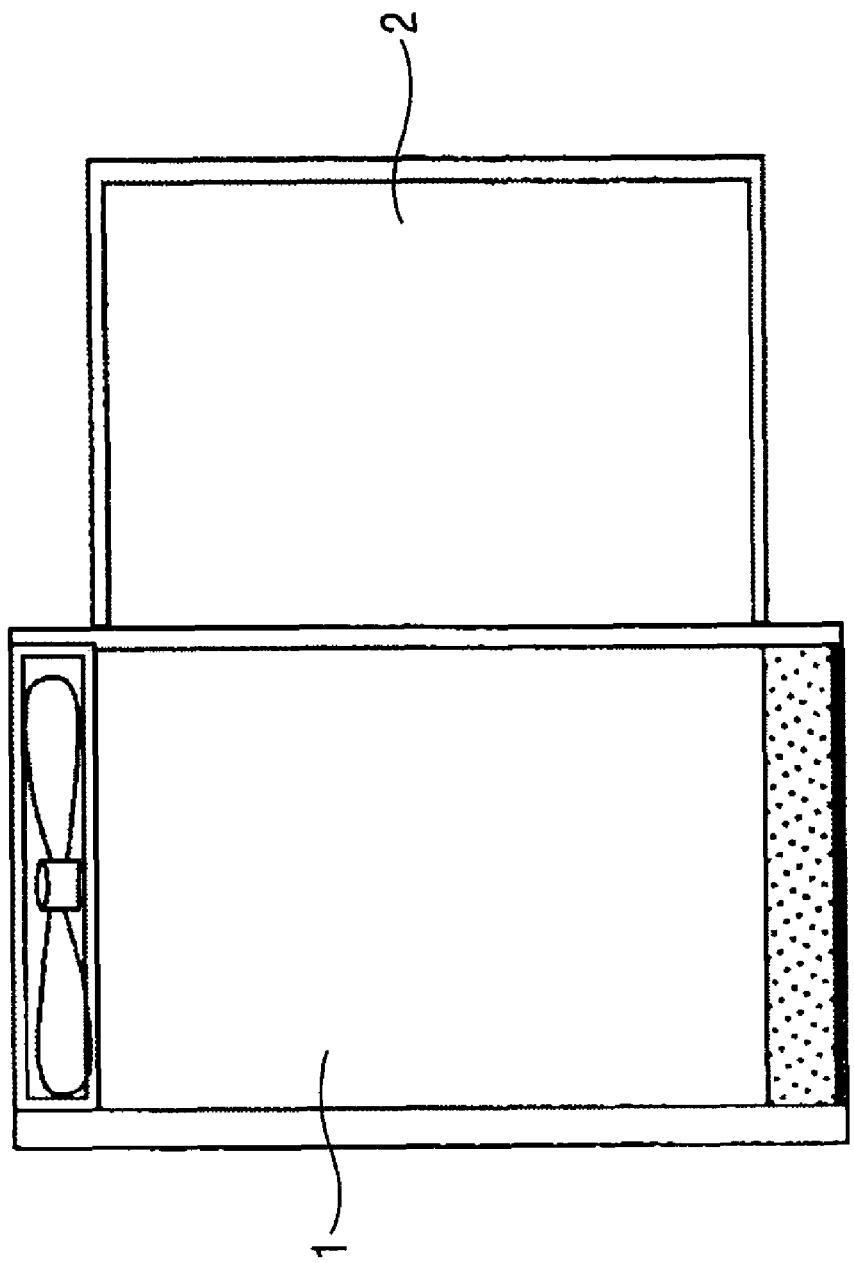
FIG. 32 A drawing showing the structure of the volatile organic compound treatment apparatus according to Embodiment 7 of the invention.
Figure 33:
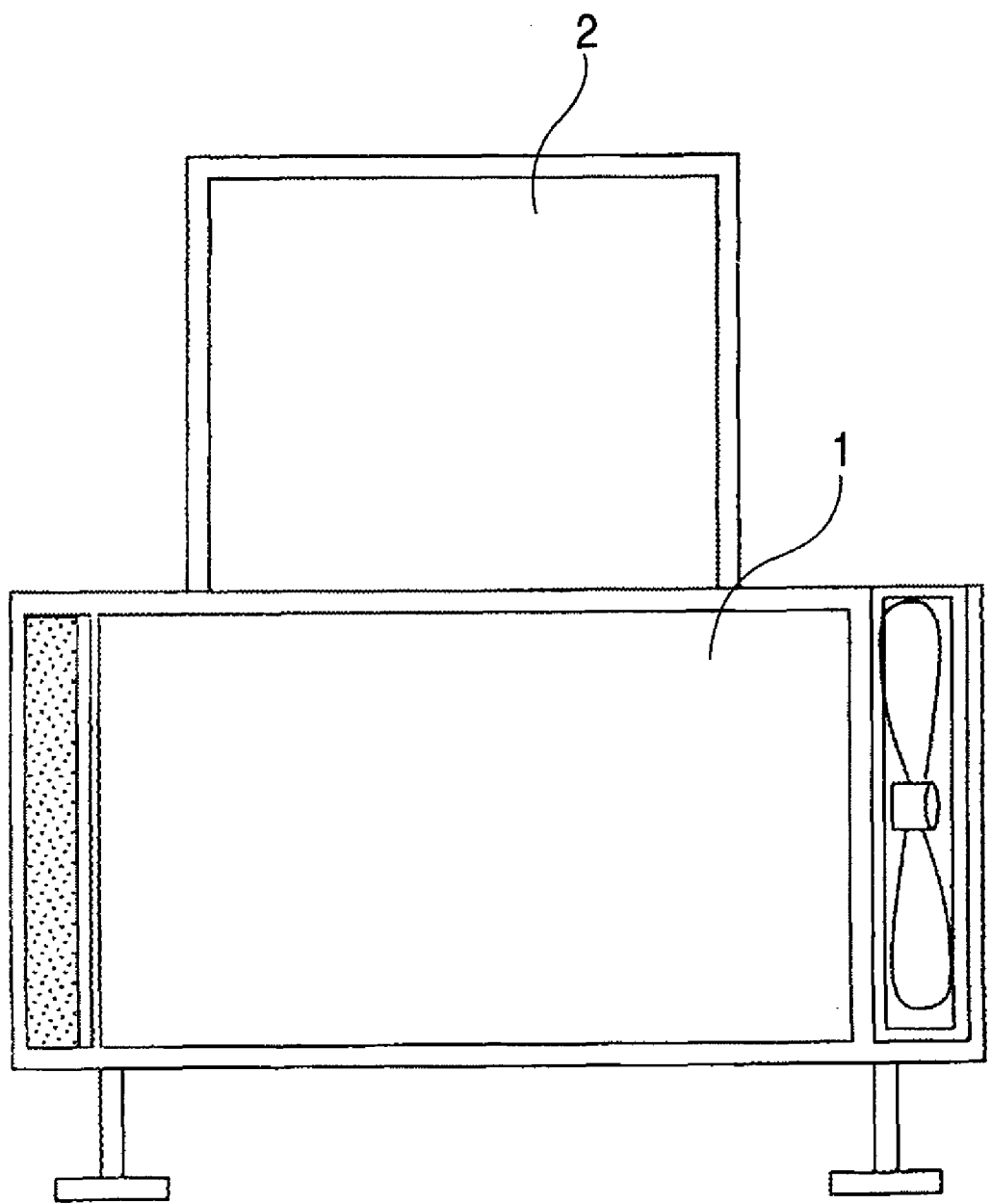
FIG. 33 A drawing showing the structure of the volatile organic compound treatment apparatus according to Embodiment 7 of the invention.

The absorption treatment chamber 1 and the absorbent recovery treatment chamber 2 may be disposed horizontally as shown in FIG. 32 or vertically as shown in FIG. 33. The positions of the absorption treatment chamber 1 and the absorbent recovery treatment chamber 2 may be freely decided depending on an installation space for the treatment apparatus and a weight of the absorbents due to the treatment air volume. When the absorption unit 3 in the absorption recovery treatment chamber 2 is placed vertically to the absorption unit in the absorbent recovery treatment chamber, it is possible to house a larger number of absorption units 3 in the absorbent recovery chamber 2.

Although the recovery described in the foregoing is performed by way of discharge, the absorbent may be recovered by decomposing VOC through oxidative decomposition using heat or the like for the absorbent recovery.

Also, though the chiller is used for eliminating heat generated by the discharge, an absorption type heat exchanger may be used for eliminating the heat, which makes it possible to reuse the warmed water.

The invention claimed is:

1. A volatile organic compound treatment apparatus comprising:
    an absorption treatment chamber in which absorption units containing absorbents that absorb volatile organic compounds are aligned in a direction of a gas flow;
    an absorbent recovery treatment chamber that is provided with a discharge unit including a high voltage electrode, a ground electrode, a dielectric, and an elastic body that presses a respective one of the absorption units together with the discharge unit to form a uniform discharge gap during an electrical discharge; and
    a transfer mechanism that transfers the absorption unit positioned in an upstream of the gas flow to the absorbent recovery treatment chamber and that transfers the absorption unit in the absorbent recovery treatment chamber to a downstream of the gas flow.

2. The volatile organic compound treatment apparatus according to claim 1, wherein the discharge unit includes a discharge space that receives the absorption units, and wherein the discharge unit recovers absorbent in the respective absorption unit when the respective absorption unit is received in the discharge space in the discharge unit and decomposes the volatile organic compounds absorbed by the absorbent by the electrical discharge.

3. The volatile organic compound treatment apparatus according to claim 1, wherein the absorption unit is formed to have a form of a chain.

4. The volatile organic compound treatment apparatus according to claim 1, wherein the absorption units are suspended.

5. The volatile organic compound treatment apparatus according to claim 1, wherein the absorption treatment chamber includes a mechanism that supplies a gas containing oxygen when recovering the absorption units.

6. The volatile organic compound treatment apparatus according to claim 5, wherein the absorption treatment chamber intermittently supplies the gas containing oxygen when recovering the absorption units.

7. The volatile organic compound treatment apparatus according to claim 1, further comprising a sensor that measures a concentration of a volatile organic substance in a treated gas.

8. The volatile organic compound treatment apparatus according to claim 1, wherein the absorption treatment chamber includes a mechanism that uses a heat generated by the discharge as a source of secondary heat exchange.

9. The volatile organic compound treatment apparatus according to claim 1, wherein the absorption unit comprises hydrophobic zeolite.

10. The volatile organic compound treatment apparatus according to claim 9, wherein the absorption unit is formed to have a form of a panel.

11. The volatile organic compound treatment apparatus according to claim 9, wherein the absorption unit comprises a noble metal catalyst.

12. The volatile organic compound treatment apparatus according to claim 9, wherein the absorption unit comprises a catalyst capable of decomposing ozone.

13. The volatile organic compound treatment apparatus according to claim 12, wherein the catalyst capable of decomposing ozone is deposited on an absorbing agent forming the absorption units.

14. The volatile organic compound treatment apparatus according to claim 1, wherein the discharge unit comprises a unit for heating the absorption units.

15. The volatile organic compound treatment apparatus according to claim 1, wherein, during discharge, the absorption unit is sandwiched between the dielectric and the ground electrode such that the absorbent and the dielectric are in close contact with each other, and the absorbent and the ground electrode are in close contact with each other.

16. The volatile organic compound treatment apparatus according to claim 15, wherein the elastic body includes at least one spring that is elastic enough to hold the ground electrode in such a manner as to keep a gap length of the discharge gap constant when sandwiching the adsorbent.

* * * * *